United States Patent
Yoshimura

(10) Patent No.: US 8,487,928 B2
(45) Date of Patent: Jul. 16, 2013

(54) GAME PROGRAM, GAME APPARATUS, AND GAME CONTROL METHOD

(75) Inventor: Hiroyuki Yoshimura, Hyogo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 914 days.

(21) Appl. No.: 12/412,982

(22) Filed: Mar. 27, 2009

(65) Prior Publication Data

US 2009/0262112 A1    Oct. 22, 2009

(30) Foreign Application Priority Data

Apr. 17, 2008  (JP) ................................ 2008-108273
Sep. 29, 2008  (JP) ................................ 2008-250524

(51) Int. Cl.
*G06T 15/10* (2011.01)
*G06T 15/20* (2011.01)
*G06T 13/00* (2011.01)
*G06T 15/00* (2011.01)
*A63F 9/24* (2006.01)

(52) U.S. Cl.
USPC .............. 345/427; 463/32; 345/473; 345/419

(58) Field of Classification Search
None
See application file for complete search history.

(56) References Cited

U.S. PATENT DOCUMENTS

| 6,398,647 | B1 | 6/2002 | Hirai et al. | |
|---|---|---|---|---|
| 6,803,912 | B1 * | 10/2004 | Mark et al. | 345/427 |
| 2004/0209684 | A1 * | 10/2004 | Hisano | 463/32 |
| 2005/0266921 | A1 | 12/2005 | Hayashida et al. | |

FOREIGN PATENT DOCUMENTS

| JP | 2000-179188 | * | 6/2000 |
|---|---|---|---|
| JP | 2001-353358 | A | 12/2001 |
| JP | 2004-130003 | A | 4/2004 |
| JP | 2005-319220 | A | 11/2005 |
| JP | 2006-314763 | A | 11/2006 |
| WO | WO-98/43715 | A1 | 10/1998 |

OTHER PUBLICATIONS

Sada Hironori, "Game Apparatus and Information Storage Medium", Japanese patent application 2000-179188, Date of Filing Jun. 14, 2000.*
Malandain and Jean-Daniel Boissonnat. 2002. Computing the Diameter of a Point Set. In Proceedings of the 10th International Conference on Discrete Geometry for Computer Imagery (DGCI '02), Achille J.-P. Braquelaire, Jacques-Olivier Lauchaud, and Anne Vialard (Eds.). Springer-Verlag, London, UK, UK, 197-208.*

* cited by examiner

*Primary Examiner* — Kee M Tung
*Assistant Examiner* — Zhengxi Liu
(74) *Attorney, Agent, or Firm* — Global IP Counselors, LLP

(57) ABSTRACT

A virtual camera for displaying characters to be imaged on a monitor can be readily set. In the present program, a virtual camera and imaging space are set in a virtual game space. A plurality of characters are arranged in the virtual game space. A controller determines whether or not the plurality of characters are positioned inside the imaging space. At least one option among the viewing angle of the virtual camera and the position of the virtual camera is modified. Therefore, when any single character among a plurality of characters is positioned outside the imaging space, the character positioned outside the imaging space is positioned inside the imaging space. The plurality of characters are displayed on the image display unit.

10 Claims, 15 Drawing Sheets

GAME PROGRAM, GAME APPARATUS, AND GAME CONTROL METHOD

CROSS-REFERENCE TO THE RELATED APPLICATIONS

This application claims priority to Japanese Patent Application Nos. 2008-108273 and 2008-250524. The entire disclosure of Japanese Patent Application Nos. 2008-108273 and 2008-250524 is hereby incorporated herein by reference.

BACKGROUND OF THE INVENTION

1. Field of the Invention

The present invention relates to a game program, and particularly to a game program for implementing in a computer a game in which characters are arranged in a virtual game space, and the characters are displayed on an image display unit. The present invention also relates to a game apparatus and a game control method implemented by the game program.

2. Description of the Related Art

Various video games have been conventionally proposed. The video games are executed in a game apparatus. For example, a common game apparatus has a monitor, a game machine main unit separate from the monitor, and an input unit, e.g., a controller separate from the game machine main unit. A plurality of input buttons are arranged in the controller.

A known example of a game executed by such a game apparatus is a baseball game (see Professional Baseball Spirits 4, Konami Digital Entertainment, PS3, Released on Apr. 1, 2007). Baseball games include games in which a player uses a controller to control the player characters of one's own team and competes for points with a counterpart team, and games in which the game as such is carried out in an automatic manner and the player takes on the role of a manager.

For example, in the former game, a player operates the controller to thereby operate a fielder character when a player's own team is playing defense, whereby the fielder character is arranged to throw the ball. On the other hand, a counterpart player uses a controller to operate a batter character when a counterpart team is playing offense, whereby the batter character is arrange to perform swinging action (see Professional Baseball Spirits 4, Konami Digital Entertainment, PS3, Released on Apr. 1, 2007).

In such a game, for example, where the batter character hits an outfield fly ball and a runner is on third base, the third base runner character can tag up when a fielder character catches the ball. Accordingly, when the third base runner character tags up, the runner character who tags up and the catcher character who will catch the ball thrown from the fielder character in the outfield are displayed on the monitor. What is shown on the monitor in this case is the video of a close play, i.e., a state in which a contact is made near home base between the runner character who rushes to the home base and the catcher character that catches the ball thrown from the fielder character in the outfield.

SUMMARY OF THE INVENTION

In a conventional baseball game, a video of a close play is displayed on the monitor when the close play has occurred. The position, the viewing angle, and a like of a virtual camera disposed in a game space must be adjusted in order to display the video of the close play on the monitor. Accordingly, the game producers manually adjust the position, the viewing angle, and the like of the virtual camera so that the video of the close play is accommodated on the monitor screen. Recent game apparatuses in particular have the capability of showing a video on a monitor from various directions and angles. Therefore, the game producers are required to adjust the position and the viewing angle of the virtual camera for each direction and each viewing angle, when a close play is to be shown from the various directions and the angles by using this capability in a baseball game. For this reason, the game producers must expend considerable effort and time to adjust the position and the viewing angle of the virtual camera.

In a conventional baseball game, there are cases in which the game producers can not accommodate desired player characters on the monitor depending on conditions, even when the game producers adjust the position and the viewing angle of the virtual camera, because the player characters perform various actions in accordance with conditions in the baseball game. For example, when the game producers desire to display the runner character rushing to the home base, the catcher character, and the umpire character on the monitor in a close play near the home base cannot be displayed on the monitor depending on the conditions. Specifically, the umpire character is sometimes not displayed on the monitor even when the catcher character and the runner character rushing to the home base are displayed. In other words, there is a problem in that characters to be imaged cannot be displayed on the monitor depending on conditions such as those stated above, even when the game producers adjust the position and the viewing angle of the virtual camera with the desire to display a predetermined character as the imaging target on the monitor.

The present invention was contrived in view of the foregoing problems, and an object of the present invention is to make it possible to easily set the virtual camera for displaying the characters to be imaged.

The game program according to a first aspect is a game program for implementing the following functions in a computer that can execute a game in which characters are arranged in a virtual game space, and the characters are displayed on an image display unit.

(1) A camera setting function for setting a virtual camera in the virtual game space by causing a controller to recognize first camera-coordinate data for stipulating a position of the virtual camera in the virtual game space, second camera-coordinate data for stipulating a line-of-sight direction of the virtual camera when the virtual game space is imaged from the position of the virtual camera, and viewing angle data for stipulating a viewing angle of the virtual camera.

(2) An imaging space stipulation function for stipulating an imaging space in the virtual game space by causing the controller to recognize boundary data for stipulating the imaging space to be imaged by the virtual camera in the virtual game space.

(3) A character arrangement function for arranging a plurality of the characters in the virtual game space by causing the controller to recognize coordinate data of each of the plurality of characters positioned inside the virtual game space.

(4) A character position determination function for causing the controller to determine whether or not the plurality of characters are positioned inside the imaging space on the basis of the coordinate data of each of the plurality of characters.

(5) A first camera setting modification function for causing the controller to execute a process for modifying at least one option in the viewing angle of the virtual camera and the position of the virtual camera so that, when at least one character of the plurality of characters is determined by the controller to be positioned outside the imaging space, the character positioned outside the imaging space is positioned inside the imaging space.

(6) A character display function for displaying each of the plurality of characters on the image display unit using character image data.

In the game program, the virtual camera is set in the virtual game space by the camera setting function by causing the controller to recognize first camera-coordinate data for stipulating the position of the virtual camera in the virtual game space, the second camera-coordinate data for stipulating the line-of-sight direction of the virtual camera in which the position of the virtual camera is used as a reference, and the viewing angle data for stipulating the viewing angle of the virtual camera. In the imaging space stipulation function, the imaging space is stipulated in the virtual game space by causing the controller to recognize the boundary data for stipulating the imaging space to be imaged by the virtual camera in the virtual game space. In the character arrangement function, the plurality of the characters are arranged in the virtual game space by causing the controller to recognize the coordinate data of each of the plurality of characters positioned inside the virtual game space. In the character position determination function, the controller determines whether or not the plurality of characters are positioned inside the imaging space on the basis of the coordinate data of each of the plurality of the characters. In the first camera setting modification function, the controller executes a process for modifying at least one option in the viewing angle of the virtual camera and the position of the virtual camera so that, when at least one character of the plurality of characters is determined by the controller to be positioned outside the imaging space, the character positioned outside the imaging space is positioned inside the imaging space. In the character display function, each of the plurality of characters is displayed on the image display unit using character image data.

Following is a description of the game program using as an example of the case in which the game program is applied to a baseball game. In the game program, a virtual camera is set in a virtual game space by causing a controller to recognize first camera-coordinate data for stipulating a position of the virtual camera in the virtual game space, second camera-coordinate data for stipulating a line-of-sight direction of the virtual camera in which the position of the virtual camera is used as a reference, and viewing angle data for stipulating a viewing angle of the virtual camera. In the virtual game space, the imaging space is stipulated in the virtual game space by causing the controller to recognize boundary data for stipulating the imaging space to be imaged by the virtual camera. Here, a plurality of characters are arranged in the virtual game space by causing the controller to recognize the coordinated data of each of the plurality of characters (player characters, umpire characters, and the like) positioned inside the virtual game space. The controller determines whether or not the plurality of characters are positioned inside the imaging space on the basis of the coordinate data of each of the plurality of characters. The controller executes the process for modifying at least one option in the viewing angle of the virtual camera and the position of the virtual camera so that, when at least one character of the plurality of characters is determined by the controller to be positioned outside the imaging space, the character positioned outside the imaging space is positioned inside the imaging space. Each of the plurality of characters is displayed on the image display unit using the character image data.

In this case, a determination is made as to whether or not the plurality of characters to be imaged is positioned inside the imaging space by the virtual camera arranged in the virtual game space when the plurality of characters to be imaged are arranged in the virtual game space. At least one option in the viewing angle of the virtual camera and the position of the virtual camera is modified so that, when at least one character of the plurality of characters to be imaged is determined to be positioned outside the imaging space, the character positioned outside the imaging space is positioned inside the imaging space. Each of the plurality of characters positioned inside the imaging space is displayed on the image display unit.

In this manner, in the invention according to the first aspect, at least one option among the viewing angle of the virtual camera and the position of the virtual camera is modified when the character to be imaged is positioned outside the imaging space. The character to be imaged that is positioned outside the imaging space is arranged inside the imaging space. In this manner, at least one option in the viewing angle of the virtual camera and the position of the virtual camera is modified, and the plurality of characters to be imaged who are positioned outside the imaging space can be arranged inside the imaging space, even when the character to be imaged is positioned outside the imaging space. Accordingly, in a game to which the invention according to the first aspect is applied, the character to be imaged can be readily accommodated on the monitor without manually setting the virtual camera. In other words, in the invention according to the first aspect, the virtual camera for displaying the character to be imaged on the monitor can be readily set.

The game program according to a second aspect is the game program recited in the first aspect, wherein the controller executes at least one process for enlarging the viewing angle of the virtual camera, and a process for moving the position of the virtual camera in a direction away from the plurality of characters, so that a character positioned outside the imaging space is positioned inside the imaging space when at least one character among the plurality of characters is determined by the controller to be positioned outside the imaging space. The function is implemented in the first camera setting modification function.

Following is a description of the game program using as an example of the case in which the game program is applied to a baseball game. In the game program, the controller executes at least one process for enlarging the viewing angle of the virtual camera, and the process for moving the position of the virtual camera in the direction away from the plurality of characters, so that a character positioned outside the imaging space is positioned inside the imaging space when at least one character among the plurality of characters is determined by the controller to be positioned outside the imaging space.

In this case, at least one process is executed among a process for enlarging the viewing angle of the virtual camera, and the process for moving the position of the virtual camera in the direction away from the plurality of characters, so that a character positioned outside the imaging space is positioned inside the imaging space when at least one character among the plurality of characters to be imaged is determined to be positioned outside the imaging space.

In this manner, in the invention according to the second aspect, a character to be imaged that is positioned outside the imaging space can be arranged inside the imaging space by enlarging the viewing angle of the virtual camera or moving the position of the virtual camera in a direction away from the plurality of characters when the character to be imaged is positioned outside the imaging space. Accordingly, in a game to which the invention according to the second aspect is applied, the character to be imaged can be reliably accommodated on the monitor without manually setting the virtual camera. In other words, in the invention according to the second aspect, the virtual camera can be readily set, and the characters to be imaged can be reliably displayed on the monitor.

The game program according to a third aspect is the game program recited in the first and second aspects, wherein the controller executes a process for modifying at least one option in the viewing angle of the virtual camera and the position of the virtual camera, and a process for modifying the line-of-sight direction of the virtual camera is executed by the controller. Therefore, when at least one character of the plurality of characters is determined by the controller to be positioned outside the imaging space, the character positioned outside the imaging space is positioned inside the imaging space. The controller executes the process for modifying the line-of-sight direction of the virtual camera. The function is implemented in the first camera setting modification function.

Following is a description of the game program using as an example of the case in which the game program is applied to a baseball game. In the game program, the controller executes a process for modifying at least one option in the viewing angle of the virtual camera and the position of the virtual camera, and a process for modifying the line-of-sight direction of the virtual camera is executed by the controller, so that, when at least one character of the plurality of characters is determined by the controller to be positioned outside the imaging space, the character positioned outside the imaging space is positioned inside the imaging space. The process for modifying the line-of-sight direction of the virtual camera is executed by the controller.

In this case, at least one option in the viewing angle of the virtual camera and the position of the virtual camera is modified so that, when at least one character among the plurality of characters to be imaged is determined to be positioned outside the imaging space, the character positioned outside the imaging space is positioned inside the imaging space. The process for modifying the line-of-sight direction of the virtual camera is executed by the controller.

In this manner, in the invention according to the third aspect, a character to be imaged that is positioned outside the imaging space can be arranged inside the imaging space by modifying at least one option in the viewing angle of the virtual camera and the position of the virtual camera when the character to be imaged is positioned outside the imaging space. Here, the plurality of characters to be imaged can be arranged with good balance inside the imaging space by modifying the viewing angle of the virtual camera. Accordingly, in a game to which the invention of the third aspect is applied, the characters to be imaged can be displayed on the monitor with good balance without manually setting the virtual camera. In other words, in the invention according to the third aspect, the virtual camera can be readily set in order to display the characters to be imaged on the monitor with good balance.

The game program according to a fourth aspect is the game program recited in the third aspect, wherein the controller executes a process for calculating coordinate data that corresponds to the center point of two of the characters on the basis of the coordinate data of each of the two characters disposed at the maximum (longest) horizontal distance from each other in the virtual game space; and causes the controller to recognize the coordinate data of the center point as the second coordinate data, whereby the line-of-sight direction of the virtual camera is modified. The function is implemented in the first camera setting modification function.

Following is a description of the game program as an example of a case in which the game program is applied to a baseball game. In the game program, the controller executes a process for calculating coordinate data that corresponds to the center point of two characters to be imaged on the basis of the coordinate data of each of the two characters to be imaged that are disposed at the maximum horizontal distance from each other in the virtual game space, and the controller is made to recognize the coordinate data of the center point as the second camera-coordinate data, whereby the line-of-sight direction of the virtual camera is modified.

In this case, the process is executed for calculating the center point between two characters to be imaged that are disposed at the maximum horizontal distance from each other in the virtual game space. The line-of-sight direction of the virtual camera is modified by setting the center point to be the camera viewpoint. In this manner, in the invention according to the fourth aspect, the plurality of characters to be imaged can be arranged with good balance inside the imaging space by modifying the line-of-sight direction of the virtual camera to be in the direction of the center point between the two characters to be imaged that are disposed at the maximum horizontal distance from each other. Accordingly, in a game to which the invention according to the fourth aspect is applied, the characters to be imaged can be displayed on the monitor with good balance without manually setting the virtual camera. In other words, in the invention according to the fourth aspect, the virtual camera can be readily set in order to display the characters to be imaged on the monitor with good balance.

The game program according to a fifth aspect is the game program according to any of the first to fourth aspects, wherein the controller determines for each of the plurality of characters whether or not an angle formed by a straight line connecting the virtual camera and the character, and a straight line facing the line-of-sight direction of the virtual camera is less than an angle formed by the straight line facing the line-of-sight direction of the virtual camera and the boundary of the imaging space, whereby the plurality of characters is positioned inside the imaging space. The function is implemented in the character position determination function.

Following is a description of the game program using as an example of the case in which the game program is applied to a baseball game. In the game program, it is determined for each of the plurality of characters to be imaged whether or not an angle (first angle) formed by a straight line connecting the virtual camera and the character to be imaged, and a straight line facing the line-of-sight direction of the virtual camera is less than an angle (second angle) formed by the straight line facing the line-of-sight direction of the virtual camera and the boundary of the imaging space. It is thereby determined whether or not the plurality of characters is positioned inside the imaging space.

In this case, it is determined for each of the plurality of characters to be imaged whether or not the first angle is less than the second angle. When the first angle is less than the second angle, the characters to be imaged are positioned inside the imaging space. When the first angle is equal to or greater than the second angle, the characters to be imaged are positioned outside the imaging space. In this manner, it can be determined whether or not the plurality of characters is positioned inside the imaging space. Accordingly, in a game to which the invention according to the fifth aspect is applied, the characters to be imaged can be readily displayed on the monitor without manually setting the virtual camera. In other words, in the invention according to the fifth aspect, the virtual camera can be readily set in order to display the characters to be imaged on the monitor.

The game program according to a sixth aspect is the game program recited in any of the first to fifth aspects, wherein the game program implements the following functions in a computer.

(7) A moving body arrangement function for arranging a moving body in the virtual game space by causing the controller to recognize the coordinate data of the moving body that moves in the virtual game space.

In the moving body arrangement function of the game program, a moving body is arranged in the virtual game space by causing the controller to recognize the coordinate data of the moving body that moves in the virtual game space. Here, in the character arrangement function, a first character, a second character, and a third character are arranged in the virtual game space by causing the controller to recognize the coordinate data of each of the first character with which the moving body collides, the second character positioned in a different position from the first character, and the third character positioned in a different position from the second character. In the character position determination function, the controller determines whether or not the first character, the second character, and the third character are positioned inside the imaging space on the basis of the coordinate data of the first character, the coordinate data of the second character, and the coordinate data of the third character. In the first camera setting modification function, the controller executes a process for modifying at least one option in the viewing angle of the virtual camera and the position of the virtual camera so that the character positioned outside the imaging space is positioned inside the imaging space when a determination has been made by the controller that at least one character among the first character, the second character, and the third character is positioned outside the imaging space. In the character display function, the first character, the second character, and the third character are displayed on the image display unit by using the character image data.

Following is a description of the game program using as an example of the case in which the game program is applied to a baseball game. In the game program, a ball is arranged in the virtual game space by causing the controller to recognize the coordinate data of the ball that moves in the virtual game space. Here, a catcher character, a runner character, and an umpire character are arranged in the virtual game space by causing the controller to recognize the coordinate data of the first character that catches the ball, e.g., the catcher character (the "first character with which the moving body collides" as recited in the sixth aspect), the second character, e.g., the runner character positioned in a different position from the first character, and the third character, e.g., the umpire character positioned in a different position from the second character. The controller determines whether or not the catcher character, the runner character, and the umpire character are positioned inside the imaging space on the basis of the coordinate data of the catcher character, the coordinate data of the runner character, and the coordinate data of the umpire character. The controller executes a process for modifying at least one option in the viewing angle of the virtual camera and the position of the virtual camera so that a character positioned outside the imaging space is positioned inside the imaging space when a determination has been made by the controller that at least one character among the catcher character, the runner character, and the umpire character is positioned outside the imaging space. The catcher character, the runner character, and the umpire character are furthermore displayed on the image display unit using character image data.

In this case, the ball, the catcher character that catches the ball, the runner character, and the umpire character are arranged in the virtual game space. For example, the catcher character that catches the ball, the runner character that moves toward home base, and the umpire character are arranged in the virtual game space when the ball is thrown toward the catcher character. It is determined whether or not the plurality of characters to be imaged (the catcher character, the runner character, and the umpire character) are arranged inside the imaging space to be imaged by the virtual camera arranged in the virtual game space. When it has been determined that at least one character among the plurality of characters is positioned outside the imaging space, at least one option among the viewing angle of the virtual camera and the position of the virtual camera is modified so that the character positioned outside the imaging space is positioned inside the imaging space. Each of the plurality of characters positioned inside the imaging space is displayed on the image display unit.

In this manner, in the invention according to the sixth aspect, when the characters to be imaged are the catcher character, the runner character, and the umpire character, the characters positioned outside the imaging space can be arranged inside the imaging space by modifying at least one option among the viewing angle of the virtual camera and the position of the virtual camera, even when the catcher character, the runner character, and the umpire character are positioned outside the imaging space. Accordingly, in a game to which the invention according to the sixth aspect is applied, the characters to be imaged can be readily displayed on the monitor without manually setting the virtual camera. In other words, in the invention according to the sixth aspect, the virtual camera can be readily set in order to display the characters to be imaged on the monitor.

The example described above is one in which a close play is envisioned to occur at the home base, but the present invention can also be applied to the case in which the catcher character throws the ball to a fielder character in order to prevent a stolen base when the runner character attempts to steal a base. For example, the second base defense character as "the first character" and the runner character as "the second character" are present in the vicinity of second base when the runner character moves from first base to second base in order to steal second base, and the catcher character throws the ball to the second base fielder character in order to tag the runner character out. The umpire character is present as "the third character" for judging whether or not the runner character is safe or out when the second base fielder character that has caught the ball thrown by the catcher character touches the runner character. In this case as well, in accordance with the invention according to the sixth aspect, the virtual camera is automatically set so that the umpire character as the third character is unmistakably within the screen. Accordingly, the characters can be made to reliably appear without being left out of an important scene or a turning point situation in the game. When the screen is manually configured by the game software developer, there is a latent possibility that "the third character" will be left out of the screen even under the careful attention of the developer. However, in accordance with the present invention, such a possibility can be eliminated and the work (labor) of the developer can be considerably reduced.

In the second example described above, "the third character" can be defined to be a character for determining a competition result between "the first character" and "the second character" in a competitive state (individual competitive situation (scene) in the competitive game).

The game program according to a seventh aspect is the game program recited in any of the first to sixth aspects, wherein the game program implements the following functions in a computer.

(8) An object arrangement function for arranging a static object in a virtual game space by causing a CPU 7 to recognize coordinate data of the static object inside the virtual game space.

In the object arrangement function of the game program, the static object is arranged in the virtual game space by causing a CPU 7 to recognize coordinate data of the static object inside the virtual game space. Here, in the camera setting function, the virtual camera is set in the virtual game space by causing the controller to recognize the first camera-coordinate data for stipulating the position of the virtual camera in the virtual game space, the second camera-coordinate data which shows the position of the static object for stipulating the line-of-sight direction of the virtual camera when the virtual game space is imaged from the position of the virtual camera as a reference, and the viewing angle data for stipulating the viewing angle of the virtual camera.

Following is a description of the game program using as an example of the case in which the game program is applied to a baseball game. In the game program, a base object is arranged in the virtual game space by causing the CPU 7 to recognize the coordinate data of the base object (static object) inside the virtual game space. The virtual camera is set in the virtual game space by causing the controller to recognize the first camera-coordinate data for stipulating the position of the virtual camera in the virtual game space, the second camera-coordinate data which shows the position of the base object for stipulating the line-of-sight direction of the virtual camera when the virtual game space is imaged from the position of the virtual camera as a reference, and the viewing angle data for stipulating the viewing angle of the virtual camera.

In this case, the characters (the characters to be imaged) related to the play in the vicinity of the base are more readily arranged inside the imaging space because the line-of-sight direction of the virtual camera is set using the position of the base object as a reference. Here, examples of a subject play include plays at the home base and plays at the first base, the second base, and the third base, and the characters related to a play near each of the bases are readily arranged inside the imaging space. Accordingly, the characters can be readily made to appear on the screen without being left out of an important scene or a turning point situation in the game. For this reason, when the screen is manually configured by the game software developer, the work (labor) of the developer can be considerably reduced.

The game program according to an eighth aspect is the game program recited in the seventh aspects, wherein the game program implements the following functions in a computer.

(9) A character positional relationship determination function for causing the controller to determine whether or not another character is positioned between the virtual camera and any one character among the plurality of characters on the basis of the first camera-coordinate data and the coordinate data of each of the plurality of characters.

(10) A second camera modification function for moving the position of the virtual camera at a predetermined angle using the position of the static object as a reference when the controller has determined that the other character is positioned between the virtual camera and any one of the plurality of characters.

In the character positional relationship determination function of the game program, the controller determines whether or not another character is positioned between the virtual camera and any one character among the plurality of characters on the basis of the first camera-coordinate data and the coordinate data of each of the plurality of characters. In the second camera modification function, the position of the virtual camera is moved at the predetermined angle using the position of the base object (static object) as the reference when the controller has determined that the other character is positioned between the virtual camera and any one of the plurality of characters.

Following is a description of the game program using as an example of the case in which the game program is applied to a baseball game. In the game program, the controller determines whether or not another character is positioned between the virtual camera and a certain character on the basis of the coordinate data of each of the plurality of characters (the player characters, the umpire character, and the like). Following is a description of an example of a close play near a base. The controller determines whether or not the umpire character is positioned between the fielder character and the virtual camera. When the umpire character is positioned between the fielder character and the virtual camera, the position of the virtual camera is moved by a predetermined angle using the position of the base as a reference.

In this case, the virtual camera can be moved using the position of the base as a reference when the umpire character is positioned between the fielder character and the virtual camera. Accordingly, the problem in which the umpire character becomes an obstruction and a play near a base cannot be imaged can be solved. In other words, the characters can be reliably made to appear within the screen without leaving out a character in an important scene or a turning point situation in the game. When the screen is manually configured by the game software developer, the work (labor) of the developer can be considerably reduced.

The game program according to a ninth aspect is the game program recited in any of the first to eighth aspects, wherein the game program implements the following functions in a computer.

(11) A replay determination function for causing the controller to determine whether or not the play of the character is a play to be reproduced.

In the replay determination function of the game program, the controller determines whether or not the play of the character is a play to be reproduced. Here, the plurality of characters is arranged in the virtual game space in the character arrangement function when the controller has determined that the play of the character is a play to be reproduced.

Following is a description of the game program using as an example of the case in which the game program is applied to a baseball game. In the game program, the controller determines whether or not the play of the character is a play to be reproduced. The plurality of characters is arranged in the virtual game space when the controller has determined that the play of the character is a play to be reproduced.

In this case, the plurality of characters is arranged in the virtual game space when the controller has determined that the play of the character is a play to be reproduced. When at least one character of the plurality of characters to be imaged is determined by the controller to be positioned outside the imaging space, at least one option in the viewing angle of the virtual camera and the position of the virtual camera is modified so that the character positioned outside the imaging space is positioned inside the imaging space. Each of the plurality of characters positioned inside the imaging space is displayed on the image display unit.

In this manner, in the invention according to the ninth aspect, at least one option in the viewing angle of the virtual camera and the position of the virtual camera is modified so that the characters to be imaged are positioned inside the imaging space when a play is reproduced. All of the characters to be imaged are displayed on the image display unit. The characters to be imaged can be accommodated on the monitor without manually setting the virtual camera when a replay image is to be set. In other words, the virtual camera for displaying characters to be imaged on the monitor can be readily set.

The game apparatus according to a tenth aspect is a game apparatus that can execute a game in which characters are arranged in a virtual game space, and the characters are displayed on an image display unit The game apparatus includes camera setting means (unit) for setting a virtual camera in the virtual game space by causing a controller to recognize first camera-coordinate data for stipulating a position of the virtual camera in the virtual game space, second camera-coordinate data for stipulating a line-of-sight direction of the virtual camera when the virtual game space is imaged from the position of the virtual camera, and viewing angle data for stipulating a viewing angle of the virtual camera; imaging space stipulation means (unit) for stipulating an imaging space in the virtual game space by causing the controller to recognize boundary data for stipulating the imaging space to be imaged by the virtual camera in the virtual game space; character arrangement means (unit) for arranging a plurality of the characters in the virtual game space by causing the controller to recognize coordinate data of each of the plurality of characters positioned inside the virtual game space; character position determination means (unit) for causing the controller to determine whether or not the plurality of characters is positioned inside the imaging space on the basis of the coordinate data of each of the plurality of the characters; first camera setting modification means (unit) for causing the controller to execute a process for modifying at least one option in the viewing angle of the virtual camera and the position of the virtual camera so that, when at least one character of the plurality of characters is determined by the controller to be positioned outside the imaging space, the character positioned outside the imaging space is positioned inside the imaging space; and character display means (unit) for displaying each of the plurality of characters on the image display unit using character image data.

The game control method according to an eleventh aspect is a game control method capable of controlling a game in which characters are arranged in a virtual game space, and the characters are displayed on an image display unit.

The game control method includes a camera setting step for setting a virtual camera in the virtual game space by causing a controller to recognize first camera-coordinate data for stipulating a position of the virtual camera in the virtual game space, second camera-coordinate data for stipulating a line-of-sight direction of the virtual camera when the virtual game space is imaged from the position of the virtual camera, and viewing angle data for stipulating a viewing angle of the virtual camera; an imaging space stipulation step for stipulating an imaging space in the virtual game space by causing the controller to recognize boundary data for stipulating the imaging space to be imaged by the virtual camera in the virtual game space; a character arrangement step for arranging a plurality of the characters in the virtual game space by causing the controller to recognize coordinate data of each of the plurality of characters positioned inside the virtual game space; a character position determination step for causing the controller to determine whether or not the plurality of characters are positioned inside the imaging space on the basis of the coordinate data of each of the plurality of the characters; a first camera setting modification step for causing the controller to execute a process for modifying at least one option in the viewing angle of the virtual camera and the position of the virtual camera so that the character positioned outside the imaging space is positioned inside the imaging space, when at least one character of the plurality of characters is determined by the controller to be positioned outside the imaging space; and a character display step for displaying each of the plurality of characters on the image display unit using character image data.

In the present invention, at least one option among the viewing angle of the virtual camera and the position of the virtual camera is modified when a character to be imaged is positioned outside the imaging space. The character to be imaged that is positioned outside the imaging space is arranged inside the imaging space. In this manner, at least one option among the viewing angle of the virtual camera and the position of the virtual camera is modified when the character to be imaged is positioned outside the imaging space, and the plurality of characters to be imaged that are positioned outside the imaging space can be arranged inside the imaging space. Accordingly, the characters to be imaged can be accommodated on the monitor without manually setting the virtual camera. In other words, the virtual camera can be readily set in order to display on the monitor the characters to be imaged.

BRIEF DESCRIPTION OF THE DRAWINGS

Referring now to the attached drawings which form a part of this original disclosure.

DETAILED DESCRIPTION OF THE PREFERRED EMBODIMENTS

Configuration and Operation of Game Device

Figure 1:
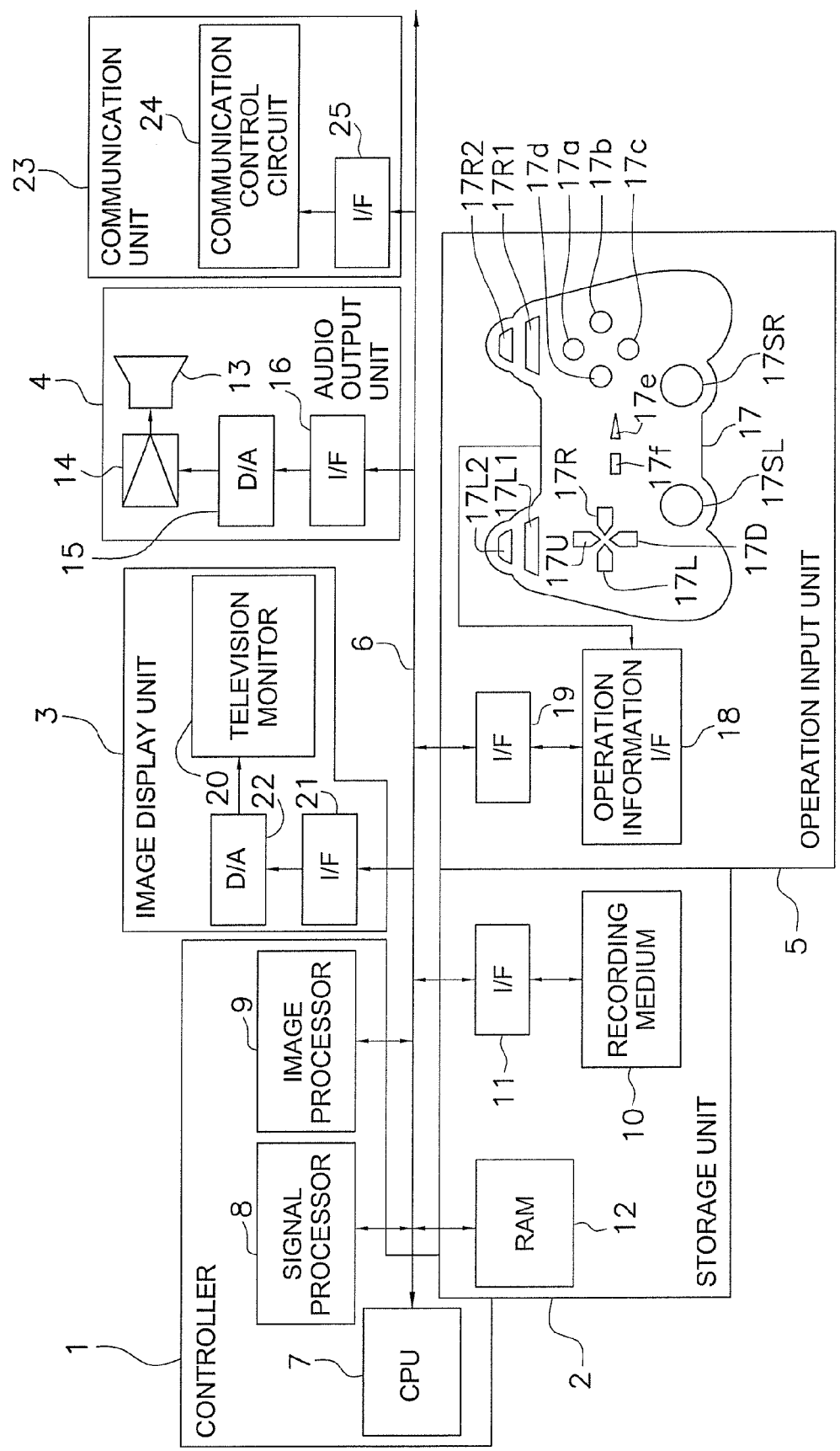
FIG. 1 is a basic block diagram of a video game apparatus according to an embodiment of the present invention.

FIG. 1 illustrates the basic configuration of a game device in accordance with an embodiment of the present invention. As an example of a video game device, a home video game device will be hereinafter explained. The home video game device includes a home video game console and a home television set. A recording medium 10 is allowed to be loaded in the home video game console. Game data is arbitrarily read out of the recording medium 10 and a game is executed. The content of the game executed herewith is displayed on the home television set.

The game system of the home video game device is made up of a controller 1, a storage unit 2, an image display unit 3, an audio output unit 4, and an operation input unit 5. These units are connected to each other through a bus 6, respectively. This bus 6 includes an address bus, a data bus, a control bus, and the like. Here, the controller 1, the storage unit 2, the audio output unit 4, and the operation input unit 5 are included in the home video game console of the home video game device, and the image display unit 3 is included in the home television set. We can describe the controller 1 as a control unit.

The controller 1 is provided for mainly controlling the state of the entire game based on the game program. For example, the controller 1 is made up of a CPU (Central Processing Unit) 7, a signal processor 8, and an image processor 9. The CPU 7, the signal processor 8, and the image processor 9 are connected to each other through the bus 6. The CPU 7 interprets a command from a game program and executes a variety of data processing and data control. For example, the CPU 7 commands the signal processor 8 to provide the image data to the image processor. The signal processor 8 mainly executes computations in the three-dimensional space, position conversion computations from the three-dimensional space to a virtual three-dimensional space, light source computation processing, and data generation and data processing of image data and audio data. The image processor 9 mainly executes processing of writing image data on a RAM (Random Access Memory) 12 based on the computation results and processing results of the signal processor 8. Note that the image data written in the RAM 12 will be subsequently rendered.

The memory unit 2 is provided mainly for storing the program data, various types of data used for the program data, and the like. For example, the storage unit 2 is made up of the recording medium 10, an interface circuit 11, and the RAM 12, for instance. The interface circuit 11 is connected to the recording medium 10. The interface circuit 11 and the RAM 12 are connected through the bus 6. The recording medium 10 stores program data of the operation system, game data made up of image data, audio data, and various types of program data, and the like. For example, the recording medium 10 is a ROM (Read Only Memory) cassette, an optical disk, a flexible disk, or the like. The program data of the operating system, the game data, and the like are stored in this recording medium 10. Note that a card memory is also included in the category of the recording medium 10. The card memory is mainly used for storing various game parameters at the point of interruption of the game. The RAM 12 is used for temporarily storing various types of data read out of the recording medium 10, and for temporarily recording the processing results of the controller 1. The RAM 12 stores address data as well as various types of data. Note that the address data indicates the memory location of various types of data. The RAM 12 is allowed to specify an arbitrary address and read/write data from/onto the address.

The image display unit 3 is provided for mainly outputting various types of image data as an image. For example, the various types of image data include the image data written onto the RAM 12 by the image processor 9 and the image data read out of the recording medium 10. For example, the image display unit 3 is made up of a television monitor 20, an interface circuit 21, a D/A converter (Digital-to-Analog converter) 22. The D/A converter 22 is connected to the television monitor 20, and the interface circuit 21 is connected to the D/A converter 22. In addition, the bus 6 is connected to the interface circuit 21. Here, the image data is provided to the D/A converter 22 through the interface circuit 21, and is converted into an analog image signal in the D/A converter 22. Then, the analog image signal is outputted to the television monitor 20 as an image.

Here, the image data includes polygon data, texture data, and the like. The polygon data is the coordinate data of vertices forming a polygon. The texture data is used for setting texture with respect to the polygon. The texture data is made up of texture specifying data and texture color data. The texture specifying data is used for associating the polygon and the texture, and the texture color data is used for specifying the texture color. Here, the polygon data and the texture data are associated with polygon address data and texture address data, respectively. The polygon address data and the texture address data include storage locations of the polygon data and the texture data, respectively. As to the image data of this type, the signal processor 8 performs coordinate conversion and perspective projection conversion with respect to the polygon data in the three-dimensional space (i.e., the three-dimensional polygon data) specified by the polygon address data based on the displacement data and the rotation amount data of the screen itself (i.e., point of sight). Accordingly, the polygon data is converted into the polygon data in the two-dimensional space (i.e., the two-dimensional polygon data). Then, a polygon outline is constituted with a plurality of two-dimensional polygon data, and texture data specified by the texture address data is written onto the internal area of the polygon. Thus, it is possible to express a variety of objects (i.e., characters) made by applying texture to each polygon.

The audio output unit 4 is provided mainly for outputting the audio data read out of the recording medium 10 as audio. For example, the audio output unit 4 is made up of a speaker 13, an amplifier circuit 14, a D/A converter 15, and an interface circuit 16. The amplifier circuit 14 is connected to the speaker 13. The D/A converter 15 is connected to the amplifier circuit 14. The interface circuit 16 is connected to the D/A converter 15. In addition, the bus 6 is connected to the interface circuit 16. Here, the audio data is provided to the D/A converter 15 through the interface circuit 16 and is converted into an analog audio signal. The analog audio signal is amplified by the amplifier circuit 14, and is outputted from the speaker 13 as audio. For example, ADPCM (Adaptive Differential Pulse Code Modulation) data, PCM (Pulse Code Modulation) data, and the like are included in the category of the audio data. In the case of the ADPCM data, it is possible to output the audio from the speaker 13 with almost the same type of the above-mentioned processing method. In the case of the PCM data, if the PCM data is converted into the ADPCM data in the RAM 12, it is possible to output the audio from the speaker 13 with almost the same type of the above-mentioned processing method.

The operation input unit 5 is mainly made up of a controller 17, an operation information interface circuit 18, and an interface circuit 19. The operation information interface circuit 18 is connected to the controller 17, and the interface circuit 19 is connected to the operation information interface circuit 18. In addition, the bus 6 is connected to the interface circuit 19.

The controller 17 is an operation unit used by the video game player for the purpose of inputting various operation commands, and transmits operation signals to the CPU 7 according to the video game player's operation. The controller 17 is provided with a first button 17a, a second button 17b, a third button 17c, a fourth button 17d, an up key 17U, a down key 17D, a left key 17L, a right key 17R, a L1 button 17L1, a L2 button 17L2, a R1 button 17R1, a R2 button 17R2, a start button 17e, a select button 17f, a left stick 17SL, and a right stick 17SR.

For example, the up key 17U, the down key 17D, the left key 17L, and the right key 17R are used for providing the CPU 7 with a command to cause the characters and a cursor to move up, down, left, and right on the screen of the television monitor 20.

For example, the start button 17e is used for commanding the CPU 7 to load the game program from the recording medium 10 and for suspending the running game program.

For example, the select button 17f is used for commanding the CPU 7 to execute various selections with respect to the game program loaded from the recording medium 10.

The left stick 17SL and the right stick 17SR are stick-shaped controllers with approximately the same configuration as a so-called joystick. This stick-shaped controller includes an upright stick. The stick is be allowed to lean from the upright position to 360-degree directions including front, back, left, and right directions, centering around the fulcrum. The left and right sticks 17SL and 17SR respectively transmit their positional information as an operation signal to the CPU 7 through the operation information interface circuit 18 and the interface circuit 19. Here, their upright positions are defined as the origin of the x-y coordinate, and their positions are accordingly expressed with values in the x-y coordinate. When the left and right sticks 17SL and 17SR are leaned, their positions are determined depending on their leaned directions and angles.

Various functions are allocated to the first button 17a, the second button 17b, the third button 17c, the fourth button 17d, the L1 button 17L1, the L2 button 17L2, the R1 button 17R1, and the R2 button 17R2 depending on the game program to be loaded from the recording medium 10.

Here, excluding the left and right sticks 17SL and 17SR, the buttons and the keys provided in the controller 17 functions as ON/OFF switches. Specifically, they are switched to an on-state when pressed from the neutral position by the external pressure. On the other hand, when the pressure is released, they return to the neutral positions and are switched to an off-state.

The general operations of the above-configured home video game device will be hereinafter explained. When a power switch (not illustrated in the figure) is turned on and the game system 1 is powered on, the CPU 7 reads out image data, audio data, and program data from the recording medium 10 based on the operating system stored in the recording medium 10. All or part of the read-out data including the image data, the audio data, and the program data are stored in the RAM 12. Then, the CPU 7 issues commands for data stored in the RAM 12 (e.g., the image data and the audio data) based on the program data stored in the RAM 12.

As for the image data, the signal processor 8 firstly performs a variety of computations (e.g., positional computation and light source computation for a character in the three-dimensional space) based on the command from the CPU 7. Next, the image processor 9 executes a variety of processing (e.g., processing for writing the image data (to be rendered) onto the RAM 12) based on the computation results by the signal processor 8. Then, the image data written onto the RAM 12 is provided to the D/A converter 22 through the interface circuit 21. Here, the image data is converted into an analog image signal by the D/A converter 22. The image data is subsequently provided to the television monitor 20 and is displayed as an image.

As for the audio data, the signal processor 8 firstly executes processing to generate and process audio data based on the command from the CPU 7. Here, a variety of processing (e.g., pitch conversion, noise addition, envelope setting, level setting, and reverb addition) are executed for the audio data. Next, the audio data is outputted from the signal processor 8, and is provided to the D/A converter 15 through the interface circuit 16. Here, the audio data is converted into an analog audio signal. Then, the audio data is outputted as the audio from the speaker 13 through the amplifier circuit 14.

Outline of Various Processing in a Game System

Figure 2:
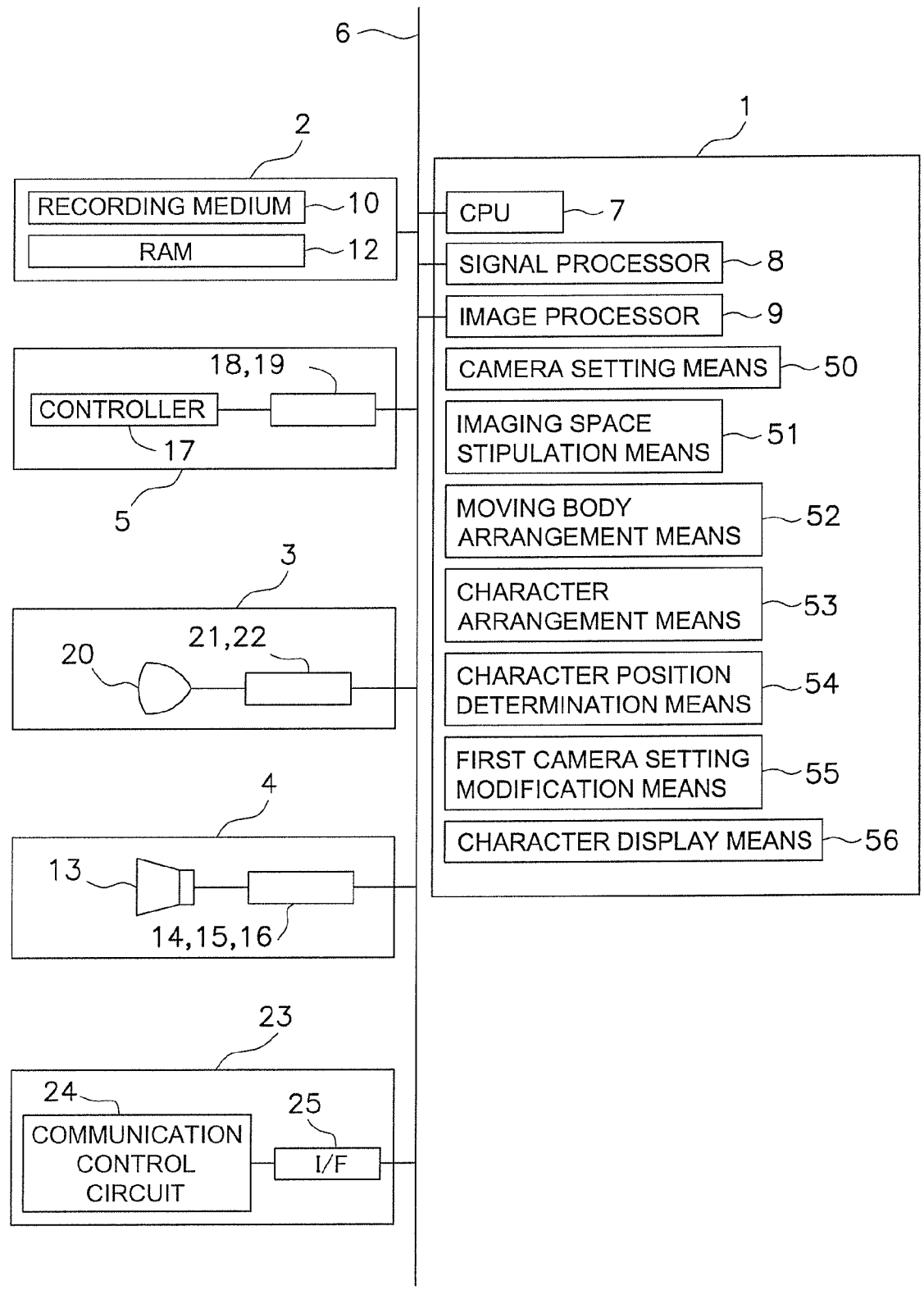
FIG. 2 is a functional block diagram of one example of the video game apparatus.

The game executed in the present game system is, e.g., a baseball game. In the present game system, a game can be executed in which characters are arranged in a virtual game space, and the characters are displayed on a television monitor 20. FIG. 2 is a function block diagram for describing the functions that play principal roles in the present invention.

Camera setting means (unit) 50 is provided with a function for setting a virtual camera in the virtual game space by causing the CPU 7 to recognize first camera-coordinate data for stipulating the position of the virtual camera in the virtual game space, second camera-coordinate data for stipulating the line-of-sight direction of the virtual camera in which the position of the virtual camera is used as a reference, and viewing angle data for stipulating the viewing angle of the virtual camera.

In the camera setting means, the virtual camera is set in the virtual game space by causing the CPU 7 to recognize first camera-coordinate data for stipulating the position of the virtual camera in the virtual game space, second camera-coordinate data for stipulating the line-of-sight direction of the virtual camera in which the position of the virtual camera is used as a reference, and viewing angle data for stipulating the viewing angle of the virtual camera.

Here, the first camera-coordinate data, the second camera-coordinate data, and the viewing angle data of the virtual camera recognized by the CPU 7 as initial conditions when the game is started are stored in a RAM 12. The data is stored in the RAM 12 when the game program is loaded from the recording medium 10 into the RAM 12. Modified data is stored in the RAM 12 when at least one type of data among the first camera-coordinate data, the second camera-coordinate data, and the viewing angle data of the virtual camera has been modified. The data stored in the RAM 12 is recognized by the CPU 7.

Imaging space stipulation means (unit) 51 is provided with a function for stipulating an imaging space in the virtual game space by causing the CPU 7 to recognize boundary data for stipulating the imaging space that will be the imaging target of the virtual camera, in the virtual game space.

In the imaging space stipulation means, the imaging space is stipulated in the virtual game space by causing the CPU 7 to recognize the boundary data for stipulating the imaging space that will be the imaging target of the virtual camera in the virtual game space.

Here, a predetermined region inside all the space within the field of vision (field of vision space) of the virtual camera is stipulated as the space displayed on the monitor 20, i.e., the imaging space. In other words, the predetermined region inside the all the space within the viewing angle (field of vision space) of the virtual camera is stipulated as the imaging space. The imaging space is stipulated by setting the plane (first plane) near the camera and the plane (second plane) away from the camera and to be in predetermined positions in the virtual game space. For example, the first and second planes are stipulated by the virtual game space by causing the CPU 7 to recognize two predetermined position coordinate data (first plane boundary data and second plane boundary data) in which the position of the virtual camera is used as a reference.

Here, the position of the first and second planes for stipulating the imaging space are stipulated in advance in the game program, but the position of the first and second planes may be configured so as to allow arbitrary setting by the user.

Moving body arrangement means (unit) 52 is provided with a function for arranging a ball in the virtual game space by causing the CPU 7 to recognize the coordinate data of the ball, which moves in the virtual game space.

The moving body arrangement means arranges the ball in the virtual game space by causing the CPU 7 to recognize the coordinate data of the ball, which moves in the virtual game space.

For example, in the moving body arrangement means, the CPU 7 recognizes the coordinate data indicating the position of the ball thrown from a fielder character, including the pitcher character, and the coordinate data indicating the position of the ball hit by the batter character. At this point, the ball is arranged in the virtual game space in the position indicated by the coordinate data.

The coordinate data of the ball is calculated based on a trajectory formula of the ball when the ball has been thrown by the fielder character or based on a trajectory of the ball when the ball has been hit by the batter character. The trajectory formula of the ball as used herein is stipulated in advance in the game program and is stored in the RAM 12. Data that corresponds to the initial velocity of the ball, the throw angle of the ball, gravity, rotation, and the like is used as the initial conditions that are adopted when the trajectory of the ball is calculated, and the data is stored in the RAM 12.

Replay determination means (unit) is provided with a function for causing the CPU 7 to determine whether or not the play is eligible for reproduction.

In the replay determination means, the CPU 7 determines whether or not the play of the characters is a play to be reproduced. For example, the CPU 7 determines whether or not the play of the characters is a play to be reproduced on the basis of data (flag data) indicating the on-base situation and data (result data) indicating the action result of the characters. More specifically, the CPU 7 determines whether or not the play of the characters is a play to be reproduced in accordance with a combination of the flag data and the result data. Here, the combination of the flag data and the result data is stipulated in advance in the game program by, e.g., a correspondence table for the case in which the play executed in the game corresponds to a play to be reproduced.

Character arrangement means (unit) 53 is provided with a function for arranging a plurality of characters in the virtual game space by causing the CPU 7 to recognize the coordinate data of each of the plurality of characters positioned inside the virtual game space.

In the character arrangement means, a plurality of characters are arranged in the virtual game space by causing the CPU 7 to recognize the coordinate data of each of the plurality of characters positioned inside the virtual game space.

For example, the catcher character, the runner character, and the umpire character are arranged in the virtual game space by causing the CPU 7 to recognize the coordinate data of each of the fielder character that throws the ball, the runner character that moves toward a predetermined base, and a umpire character.

Here, in the virtual game space, a plurality of characters (the catcher character, the runner character, and the umpire character) to be imaged is recognized by the CPU 7 from among all of the fielder characters, the batter character, and all of the umpire characters. The catcher character, the runner character, and the umpire character are arranged in the virtual game space by causing the CPU 7 to recognize the coordinate data of catcher character, the runner character, and the umpire character.

The plurality of characters (e.g., the catcher character, the runner character, and the umpire character) to be imaged is stipulated in advance in the game program for each scene. In other words, the correspondence relationship between each scene and the characters to be imaged in each scene is stipulated in advance in the game program.

Character position determination means (unit) 54 is provided with a function for causing the CPU 7 to determine whether or not the plurality of characters is positioned inside the imaging space on the basis of the coordinate data of each of the plurality of characters.

In the character position determination means, the CPU 7 determines whether or not the plurality of characters is positioned inside the imaging space on the basis of the coordinate data each of the plurality of characters.

For example, in the character position determination means, the CPU 7 determines whether or not the catcher character, the runner character, and the umpire character are positioned inside the imaging space on the basis of the coordinate data of the catcher character, the coordinate data of the runner character, and the coordinate data of the umpire character.

More specifically, in the character position determination means, the CPU 7 calculates an angle (first angle) formed by a straight line that connects the virtual camera and the character and a straight line that faces the line-of-sight direction of the virtual camera. The CPU 7 calculates an angle (second angle) formed by the straight line that faces the line-of-sight direction of the virtual camera and the boundary of the imaging space. The CPU 7 then determines for each of the plurality of characters whether or not the first angle is less than the second angle.

Here, the first angle is less than the second angle for all characters when all of the characters are positioned inside the imaging space. Conversely, when the first angle is equal to or greater than the second angle for a character positioned outside the imaging space in the case at least one character among the plurality of characters is positioned outside the imaging space.

First camera setting modification means (unit) 55 is provided with a function for causing the CPU 7 execute a process for modifying one option among the viewing angle of the virtual camera and the position of the virtual camera so that, when the CPU 7 has determined that at least one character among the plurality of characters are positioned outside the imaging space, the character positioned outside the imaging space is positioned inside the imaging space.

In the first camera setting modification means, the CPU 7 executes a process for modifying one option among the viewing angle of the virtual camera and the position of the virtual camera so that, when the CPU 7 has determined that at least one character among the plurality of characters are positioned outside the imaging space, the character positioned outside the imaging space is positioned inside the imaging space.

For example, in the first camera setting modification means, the CPU 7 executes a process for modifying one option among the viewing angle of the virtual camera and the position of the virtual camera so that, when the CPU 7 has determined that at least one character among the catcher character, the runner character, and the umpire character is positioned outside the imaging space, the character positioned outside the imaging space is positioned inside the imaging space.

More specifically, in the first camera setting modification means, the CPU 7 executes at least one process for enlarging the viewing angle of the virtual camera and a process for moving the position of the virtual camera in a direction away from the plurality of characters so that, when the CPU 7 has determined that at least one character among the catcher character, the runner character, and the umpire character is positioned outside the imaging space, the character positioned outside the imaging space is positioned inside the imaging space. The CPU 7 then executes a process for calculating the coordinate data that corresponds to a center point of two characters on the basis of the coordinate data of each of two characters disposed at the maximum (longest) horizontal distance from each other in the virtual game space. Here, the line-of-sight direction of the virtual camera is modified by causing the CPU 7 to recognize the coordinate data of the calculated center point as the second camera-coordinate data. The plurality of characters can thereby be arranged with good balance inside the imaging space.

The CPU 7 calculates the center point of the two characters disposed at the maximum horizontal distance from each other in the virtual game space even when each character is positioned inside the imaging space, and the CPU 7 recognizes the coordinate data of the center point as the second camera-coordinate data. The plurality of characters can thereby be arranged with good balance inside the imaging space even when each character is positioned inside the imaging space.

Character display means (unit) 56 is provided with a function for displaying the plurality of characters on the television monitor 20 using character image data.

The character display means displays each of the plurality of characters on the television monitor 20 using character image data. For example, in the character display means, the catcher character, the runner character, and the umpire character arranged inside the imaging space are displayed on the television monitor 20 using the character image data.

Outline of the Scene Replay System in a Baseball Game

Figure 10:
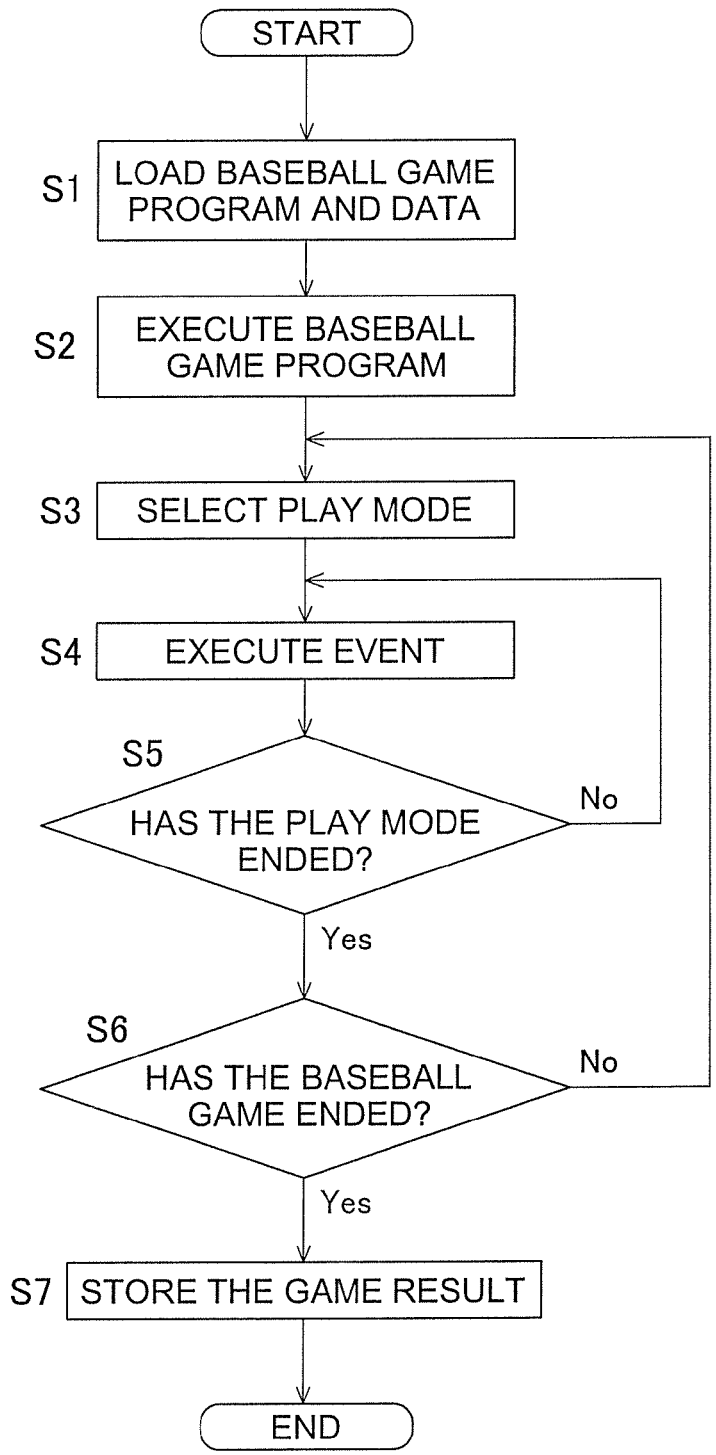
FIG. 10 is a flowchart showing an entire outline of a baseball game.
Figure 11:
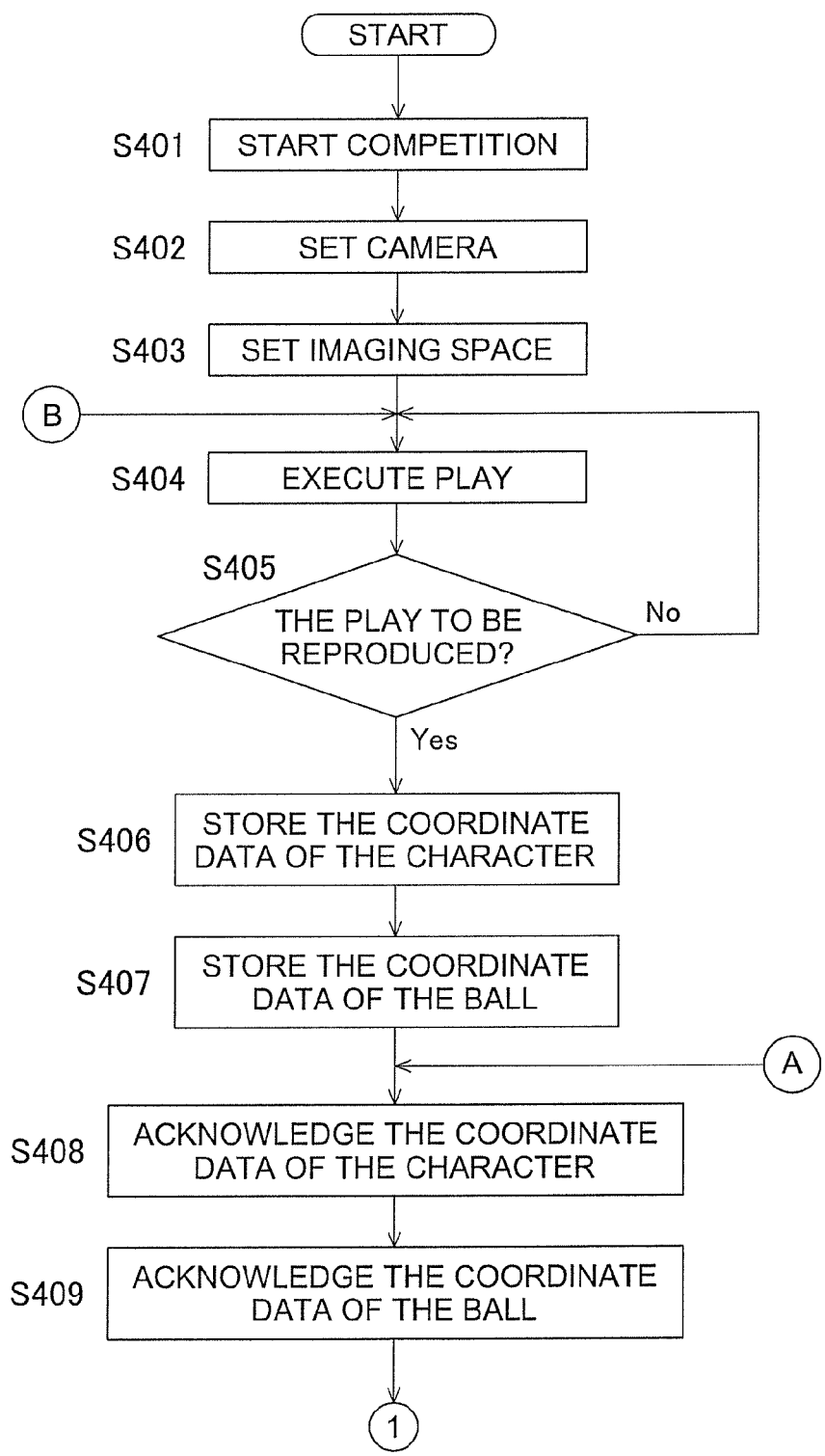
FIG. 11 is a flowchart (part 1) for describing the scene replay system.
Figure 12:
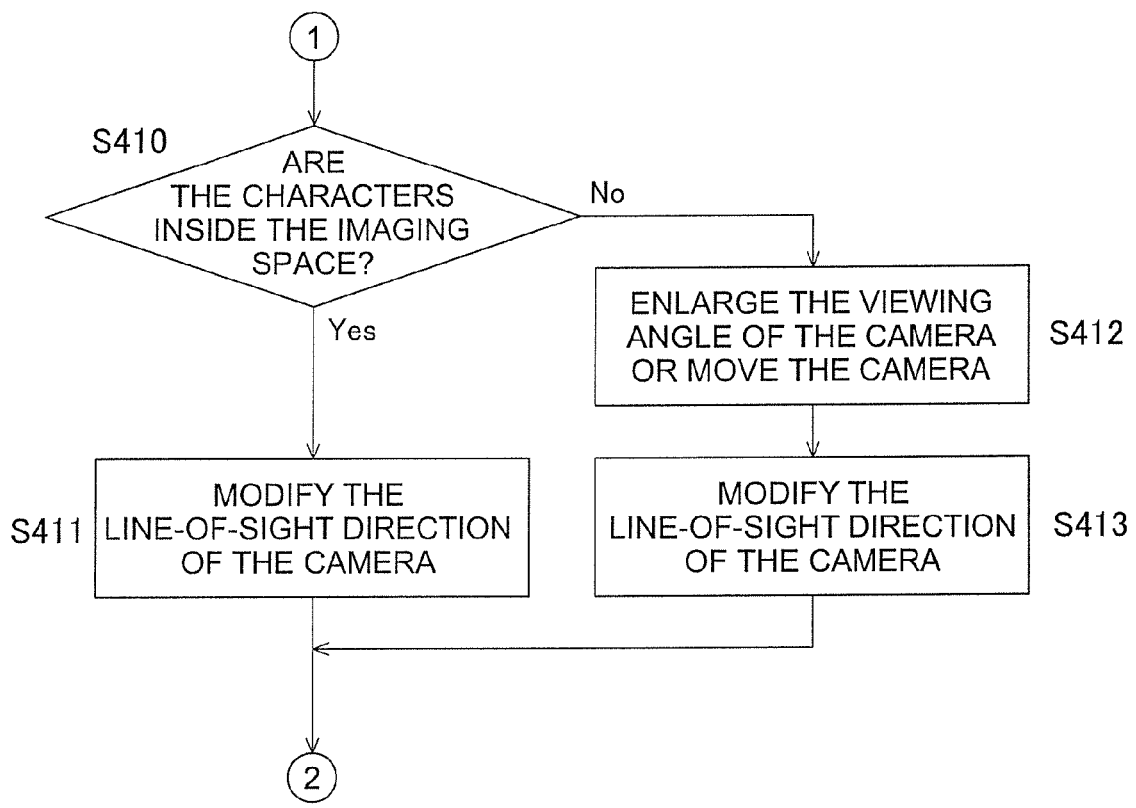
FIG. 12 is a flowchart (part 2) for describing the scene replay system.
Figure 13:
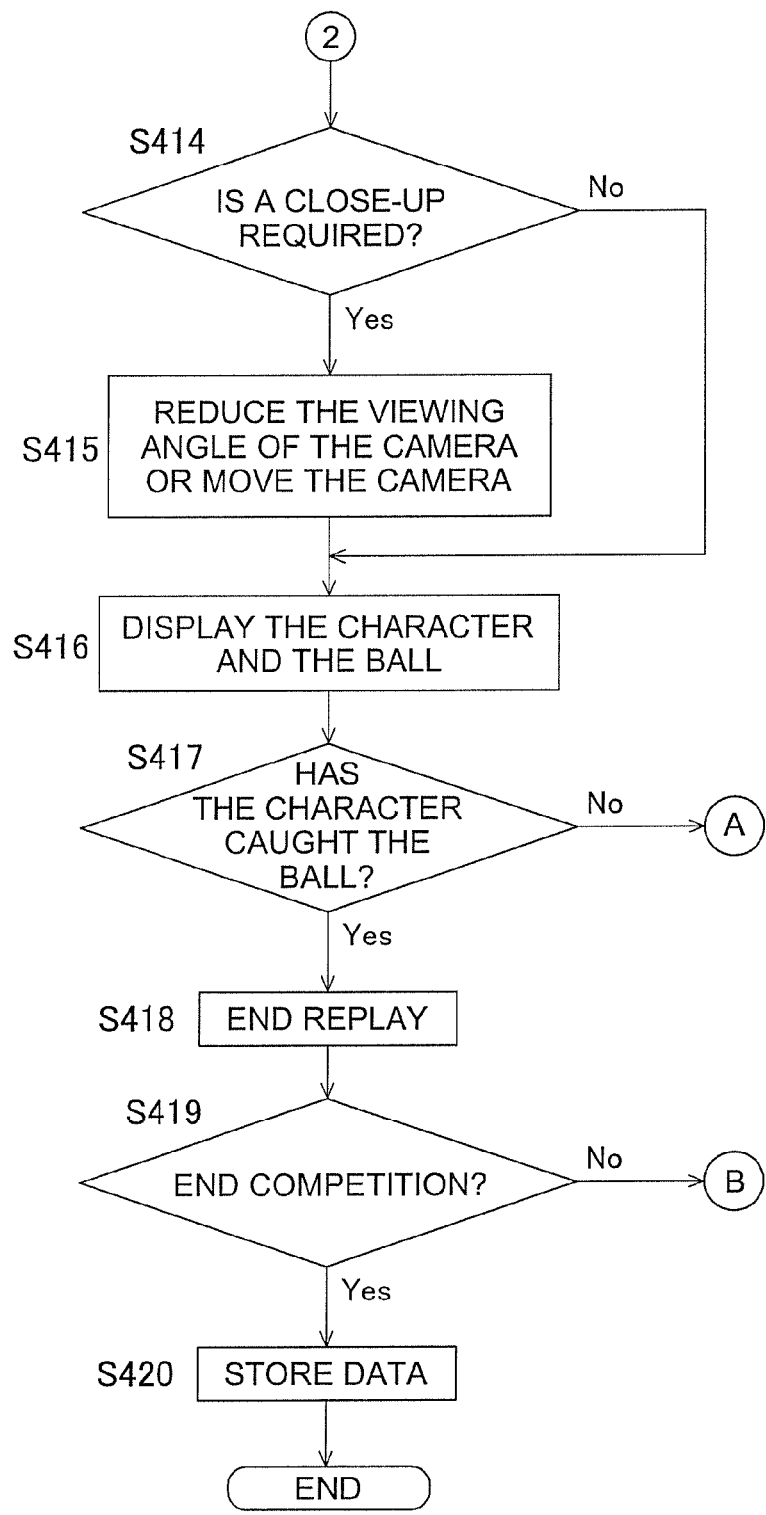
FIG. 13 is a flowchart (part 3) for describing the scene replay system.

Next, specific details of the scene replay system in the base ball game will be described. The flowcharts shown in FIGS. 10 and 11 will be described at the same time. FIG. 10 is a flowchart showing an entire outline of the baseball game, and FIG. 11 is a flowchart for describing the system.

The baseball game program is loaded and stored from the recording medium 10 into the RAM 12 when the power source of the game machine is switched on and the game machine is started up. At this point, various basic game data required for executing the baseball game is also loaded and stored from the recording medium 10 into the RAM 12 at the same time (S1).

For example, data related to various images for a 3-D game space is included in the basic game data. Examples of data related to various images for the 3-D game space that are recognized by the CPU 7 include stadium image data, player character image data, and various object image data. The basic game data includes position coordinate data for arranging in the 3-D game space the data related to various images for the 3-D game space. The basic game data further includes data used in a scene replay system for a batter character.

Next, the baseball game program stored in the RAM 12 is executed (S2) by the CPU 7 on the basis of basic game data. At this point, the startup screen of the baseball game is displayed on the television monitor 20. Next, a screen for establishing various settings for executing the baseball game is displayed on the television monitor 20. Here, for example, a mode selection screen (not shown) for selecting a play mode of the baseball game is displayed on the television monitor 20. In the mode selection screen, the player operates the controller 17 to thereby determine (S3) the play mode. Examples of the play mode include a competition mode in which a preferred team is selected from among 12 baseball teams and a single match play is enjoyed, a pennant mode in which a preferred team is selected from among 12 teams the players to compete in a pennant race, a training mode in which the player plays the role of a manager and trains the player characters on a team, and a growth experience mode in which a player experiences a baseball game by playing the role of a single player character.

Next, the CPU 7 executes (S4) various events in the play mode selected in the mode selection screen. Examples of various events executed in this case include an event automatically controlled by the CPU 7 on the basis of an AI program (Artificial Intelligence Program), and an event that is manually controlled by the player on the basis of input signals from the controller 17. Examples of player character control include automatic control for automatically giving commands to the player character on the basis of the AI program, and manual control for directly giving commands to the player character on the basis of input signals from the controller 17. In this manner, in the present baseball game, events are controlled and commands are given to player characters in accordance with instructions from the controller 17 or instructions from the AI program.

Next, the CPU 7 determines (S5) whether or not the selected play mode has ended. Specifically, the CPU 7 determines whether or not a command indicating that the play mode has ended has been issued. The CPU 7 executes a process for storing game continuation data in the RAM 12 when the CPU 7 has determined (Yes in S5) that a command indicating that the play mode has ended has been issued. When the game continuation data has been stored in the RAM 12, the selection screen for selecting whether to end the baseball game is displayed (S6) on the television monitor 20. In the selection screen, the CPU 7 executes (S7) a process for ending the baseball game when the player has operated the controller 17 and selected (Yes in S6) an item indicating the end of the baseball game. On the other hand, when the player operates the controller 17 and thereby selects (No in S6) an item in the selection screen indicating a continuation of the baseball game, the mode selection screen of step 3 (S3) is redisplayed on the television monitor 20.

The CPU 7 executes (S4) various events in the play mode selected in the mode selection screen as long as the CPU 7 has not determined (No in S5) that a command for ending the play mode has been issued.

Next, the details of the scene replay system of the batter character will be described.

An example will be described below for the case in which the scene replay system functions in the competition mode. An example is described for the case in which the scene replay system functions when the competition mode has been selected in the mode selection screen. The particular case in which a close play (scene) at the home base is to be replayed in the scene replay system is described below.

Figure 3:
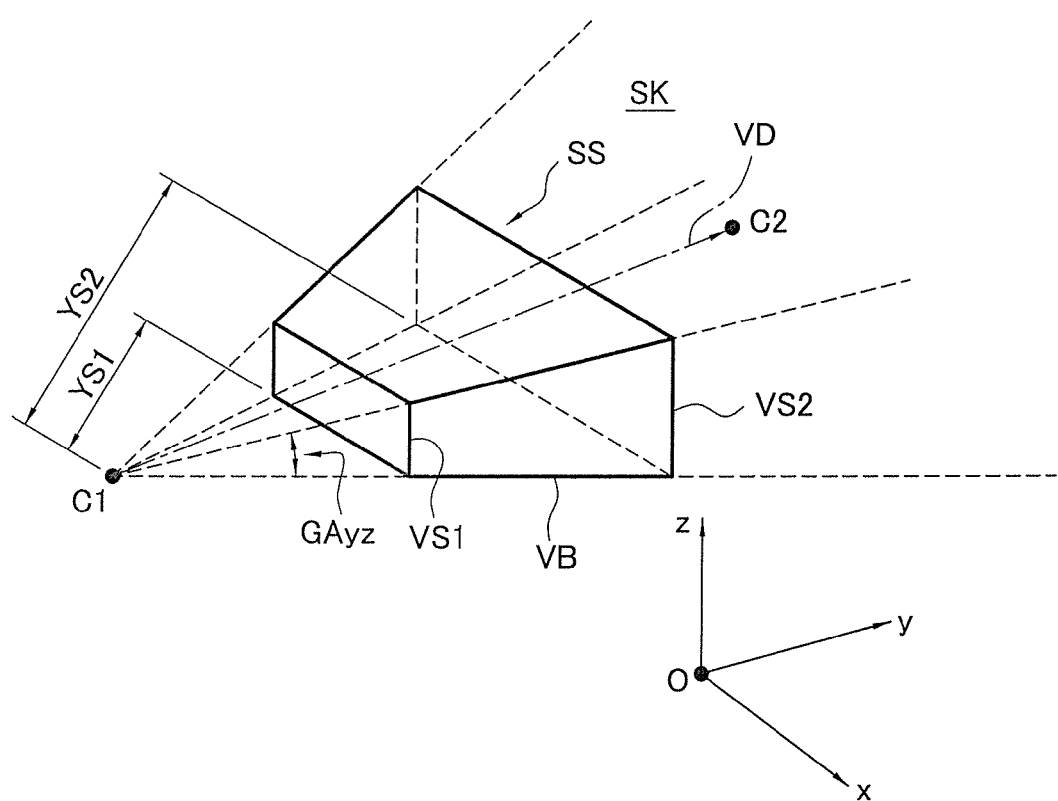
FIG. 3 is a diagram for describing the imaging space arranged in a three-dimensional game space.

When the competition mode is started (S401) in the present baseball game, the CPU 7 recognizes first camera-coordinate data for stipulating a position C1 of the virtual camera for scene replay in the 3-D virtual game space, second camera-coordinate data that indicates the position C2 for stipulating a line-of-sight direction VD of the virtual camera by using the position C1 of the virtual camera for scene replay as a reference, and viewing angle data GA for stipulating the viewing angle of the virtual camera for scene replay, as shown in FIG. 3. The virtual camera for scene replay is thereby set (S402) in the 3-D virtual game space.

Here, the coordinate system of the 3-D virtual game space is defined in the manner shown in FIG. 3. In other words, the Y direction is defined to be the direction in which the line-of-sight direction VD of the virtual camera is projected onto the horizontal plane, the Z direction is the height direction, and the X direction is the direction in which the Y- and Z-directions are mutually orthogonal. The bottom surface VB of the imaging space of FIG. 3 is disposed on the XY plane. The ground surface is defined to be the XY plane.

Next, a predetermined region inside the entire space SK (field of view space) that fits within the viewing angle of the virtual camera for scene replay is stipulated as the imaging space SS, as shown in FIG. 3. Here, the imaging space SS is stipulated (S403) in the 3-D virtual game space by setting in a predetermined position of the 3-D virtual game space a boundary, e.g., the plane VS1 (first plane) nearer to the virtual camera and the plane VS2 (second plane) away from the virtual camera, for stipulating the depth of the imaging space SS to be imaged by the virtual camera for scene replay.

Specifically, the boundary data (x1, y1+ys1, z1) of the first plane is calculated by causing the controller to execute a process for adding the distance ys1 from the position C1 of the virtual camera to the first plane VS1 to the y coordinate of the first coordinate data (x1, y1, z1) of the position C1 of the virtual camera. The boundary data (x1, y1+ys2, z1) of the second plane is calculated by causing the controller to execute a process for adding the distance ys2 from the position C1 of the virtual camera to the second plane VS2 to the y coordinate of the first coordinate data (x1, y1, z1) of the position C1 of the virtual camera. The distances ys1, ys2 are stipulated in the game program in advance, and stored in the RAM 12. There is a relationship "ys2>ys1" between the distance ys1 and the distance ys2.

The first plane VS1 and the second plane VS2 are determined in the 3-D virtual game space and the imaging space SS is stipulated in the 3-D virtual game space by causing the CPU 7 to recognize the boundary data of the first plane and the boundary data of the second plane calculated in the manner described above as the position coordinate data of the first plane VS1 and the position coordinate data of the second plane VS2.

Figure 4:
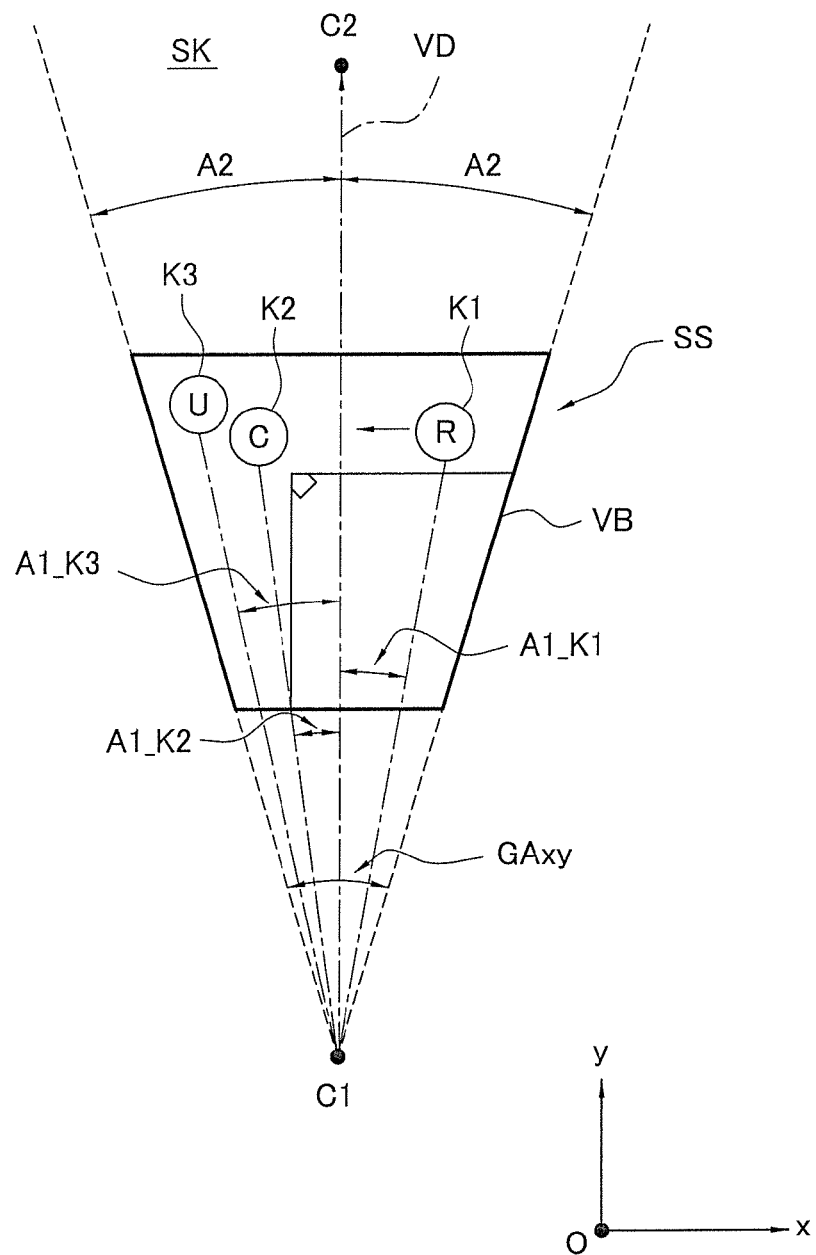
FIG. 4 is a diagram (part 1) showing the relationship between characters and the imaging space.

The boundary in the width direction of the imaging space SS to be imaged by the virtual camera for scene replay is stipulated by the first viewing angle data GAxy in the width direction of the virtual camera for scene replay (see FIG. 4). The boundary in the height direction of the imaging space SS to be imaged by the virtual camera for scene replay is stipulated by the second viewing angle data GAyz in the height direction of the virtual camera for scene replay (see FIG. 3). In this manner, the viewing angle data GA of the virtual camera for scene replay has first viewing angle data GAxy in the width direction and second viewing angle data GAyz in the height direction.

Next, when the match event is started and the play is executed (S404), the CPU 7 determines (S405) whether or not the executed play is a play to be reproduced. Here, the play to be reproduced is stipulated in the game program in advance.

Specifically, the CPU 7 determines whether or not the executed play is the play to be reproduced and is a play that has been stipulated in the advance in the game program, e.g., the case in which a runner character K1 is on third base and the batter character makes a safe hit or an outfield fly ball.

Here, the CPU 7 assigns the numerical value "1" as the value of the flag that indicates the on-base state at third base when, e.g., a runner character K1 is on third base. The CPU 7 assigns the numerical value "0" as the value of the flag that indicates the on-base state at third base when, e.g., a runner character K1 is not on third base. The CPU 7 is made to recognize the value of the flag, whereby the CPU 7 determines whether or not a runner character K1 is on third base.

For example, when the batter character has made a safe hit, the result data indicating the batting result is assigned by the CPU 7 to be any single result among the numerical value "1" that corresponds to a hit, the numerical value "2" that corresponds to a double, the numerical value "3" that corresponds to a triple, and the numerical value "4" that corresponds to a home run. The CPU 7 assigns the numerical value "11" that corresponds to an outfield fly ball as the value of the result data indicating the batting result for the case in which the batter character has hit an outfield fly ball. In the case of any other result, the CPU 7 assigns the numerical value "0" as the value of the result data indicating the batting result. The CPU 7 is made to recognize the value of the result data, whereby the CPU 7 determines whether the batter character has made a safe hit or hit an outfield fly ball.

Here, the coordinate data and the image data for reproducing the actions of the characters related to the play to be reproduced are stored (S406) in the RAM 12 when the CPU 7 has determined that the executed play is a play to be reproduced (Yes in S405). For example, the characters related to the play to be reproduced are the runner character K1, the catcher character K2, and the umpire character K2 when the runner character K1 is on third base and the batter character has made a safe hit or hit an outfield fly ball. Accordingly, in this case, the coordinate data and the image data of the runner character K1 in the play, the catcher character K2 in the play, and the umpire character K3 in the play, respectively, are stored in the RAM 12. Here, the coordinate data and the image data of the ball in the play are also stored in the RAM 12 (S407).

The coordinate data of the ball is calculated based on a trajectory formula of the ball. For example, the trajectory formula of the ball is a function of position and time. In the trajectory formula of the ball, the position of the ball in a predetermined frame is calculated by advancing time in increments of 1/60 (sec) using the time of the position at which the ball was thrown as a reference. The constants and variable that constitute the trajectory formula of the ball are stipulated in advance in the game program.

Next, the CPU 7 executes a process for executing again a play to be reproduced (a previously executed play) in the 3-D virtual game space on the basis of the data stored in the RAM 12.

First, the CPU 7 recognizes the coordinate data of each of the plurality of characters positioned inside the 3-D virtual game space. For example, for each frame, the CPU 7 recognizes (S408) the coordinate data of the runner character K1 that rushes to home base, the catcher character K2 that catches the ball, and the umpire character K3 when a runner character K1 is on third base and the batter character has made a safe hit or hit an outfield fly ball. The coordinate data of each character recognized by the CPU 7 in this situation is the data stored in the RAM 12 in step 406 (S406).

Next, the CPU 7 recognizes the coordinate data of the ball that moves in the interior of the 3-D virtual game space. For example, in each frame (1/60 sec), the CPU recognizes (S409) the coordinate data of the ball thrown from a fielder character that has caught the ball to the catcher character K2 when the runner character K1 is on third base and the batter character has made a safe hit or hit an outfield fly ball. The coordinate data of the ball recognized by the CPU 7 in this situation is the data stored in the RAM 12 in step 407 (S407).

The CPU 7 subsequently determines (S410) for each frame whether or not the plurality of characters is positioned inside the imaging space SS on the basis of the coordinate data of each of the plurality of characters of each frame. Here, for example, the CPU 7 determines whether or not the runner character K1, the catcher character K2, and the umpire character K3 are positioned inside the imaging space SS on the basis of the coordinate data of the runner character K1, the coordinate data of the catcher character K2, and the coordinate data of the umpire character K3.

Specifically, the CPU 7 first executes a process for calculating the length of first line segments that connect the virtual camera and each character on the basis of the first coordinate data of the position C1 of the virtual camera and the coordinate data of each character (the runner character K1, the catcher character K2, and the umpire character K3) in a system (XY coordinate system) in which the imaging space SS is viewed from above the 3-D virtual game space, as shown in FIG. 4. The CPU 7 also executes a process for calculating the length of a second line segment (the length of the line segments in the line-of-sight direction of the virtual camera) that connect the position of the virtual camera and the viewpoint position of the virtual camera on the basis of the first coordinate data of the virtual camera and the second coordinate data of the virtual camera. The CPU 7 furthermore executes a process for calculating the length of third line segments that connect the viewpoint position of the virtual camera and each character on the basis of the second coordinate data of the virtual camera and the coordinate data of each character.

The CPU 7 calculates the cosine of the angle A1 (=cos (A1)) formed by the first line segment and the second line segment by substituting the length of the first line segment, the length of the second line segment, and the length of the third line segment into the law of cosines. At this point, the angle A1 (first angle) formed by the first line segment and the second line segment is calculated by causing the CPU 7 to execute a process for calculating the inverse function of the cosine. In this manner, the CPU 7 sets the angle A1 (first angle) formed by the straight line connecting the virtual camera and the characters and the straight line that faces the line-of-sight direction VD of the virtual camera.

FIG. 4 shows an example of the case in which the runner character K1, the catcher character K2, and the umpire character K3 are positioned inside the imaging space. In FIG. 4, "A1_K1" is the first angle A1 for the runner character K1, "A1_K2" is the first angle A1 for the catcher character K2, and "A1_K3" is the first angle A1 for the umpire character K3.

Next, the CPU 7 calculates the angle A2 (second angle) formed by the straight line that faces the line-of-sight direction VD of the virtual camera and the boundary of the imaging space in the XY coordinate system, as shown in FIG. 4. Since the straight line of the line-of-sight direction VD of the virtual camera bisects the viewing angle of the width direction of the virtual camera, the CPU 7 multiplies by "½" the first viewing angle data GAxy that shows the viewing angle in the width direction of the virtual camera, whereby the second angle A2 is calculated. In this manner, the CPU 7 sets the angle A2 (second angle) formed by the straight line that faces the line-of-sight direction VD of the virtual camera and the boundary of the imaging space.

Here, an example is shown for the case in which the second angle A2 is calculated by causing the CPU 7 to multiply the first viewing angle data GAxy by "½." However, it is also possible to use the result of adding a predetermined numerical value (dGA1 (>0)) to the value obtained by multiplying the first viewing angle data GAxy by "½." For example, when the determination described below is made by using the second angle A2 that includes the adjustment value "dGA1," the characters can be accommodated inside the imaging space SS with a margin from the boundary. In other words, in this case, the characters can be reliably accommodated in the imaging space SS.

Next, the CPU 7 determines for each character whether or not the angle A1 (first angle) formed by the straight line that connects the virtual camera and a character and the straight line that faces the line-of-sight direction VD of the virtual camera is greater than the second angle A2 (second angle) formed by the straight line that faces the line-of-sight direction VD of the virtual camera and the boundary of the imaging space. In other words, it is determined whether or not each character is positioned inside the imaging space SS by determining whether or not the first angle A1 is less than the second angle A2.

All of the characters are positioned inside the imaging space SS when the first angle A1 of each character is determined to be less than the second angle A2 (Yes in S410: "A1_K1<A2" and "A1_K2<A2" and "A1_K3<A2"). For example, in this case, the runner character K1, the catcher character K2, and the umpire character K3 are positioned inside the imaging space SS. At this point, the CPU 7 executes a process for calculating the coordinate data that corresponds to the center point of two characters on the basis of the coordinate data of the two characters disposed at the maximum horizontal distance from each other in the 3-D virtual game space. For example, since the runner character K1 and the umpire character K3 are most greatly separated by horizontal distance in FIG. 4, the CPU 7 calculates the coordinate data of the center point of the two characters on the basis of the coordinate data of the runner character K1 and the coordinate data of the umpire character K3.

The line-of-sight direction VD of the virtual camera is modified (S411) by causing the CPU 7 to again recognize the X coordinate of the center point thus calculated as the X coordinate of the second camera-coordinate data. In other words, line-of-sight direction VD of the virtual camera is modified (S411) by causing the CPU 7 to execute a process for modifying the X coordinate of second camera-coordinate data to be the X coordinate of the center point described above. At this point, the CPU 7 executes the process of step 414 (S414) described below.

On the other hand, a character for which the first angle A1 is equal to or greater than the second angle A2 is positioned outside the imaging space SS when it has been determined that the first angle A1 is equal to or greater than the second angle A2 for at least one of the plurality of characters (No in S410: "A1_K1≧A2" and "A1_K2≧A2" and "A1_K3≧A2"). For example, in FIG. 5, since the first angle A1_K3 of the umpire character K3 is equal to or greater than the second angle A2 (since the conditional expression "A1_K3≧A2" holds true), the umpire character K3 is positioned outside the imaging space SS.

Figure 5:
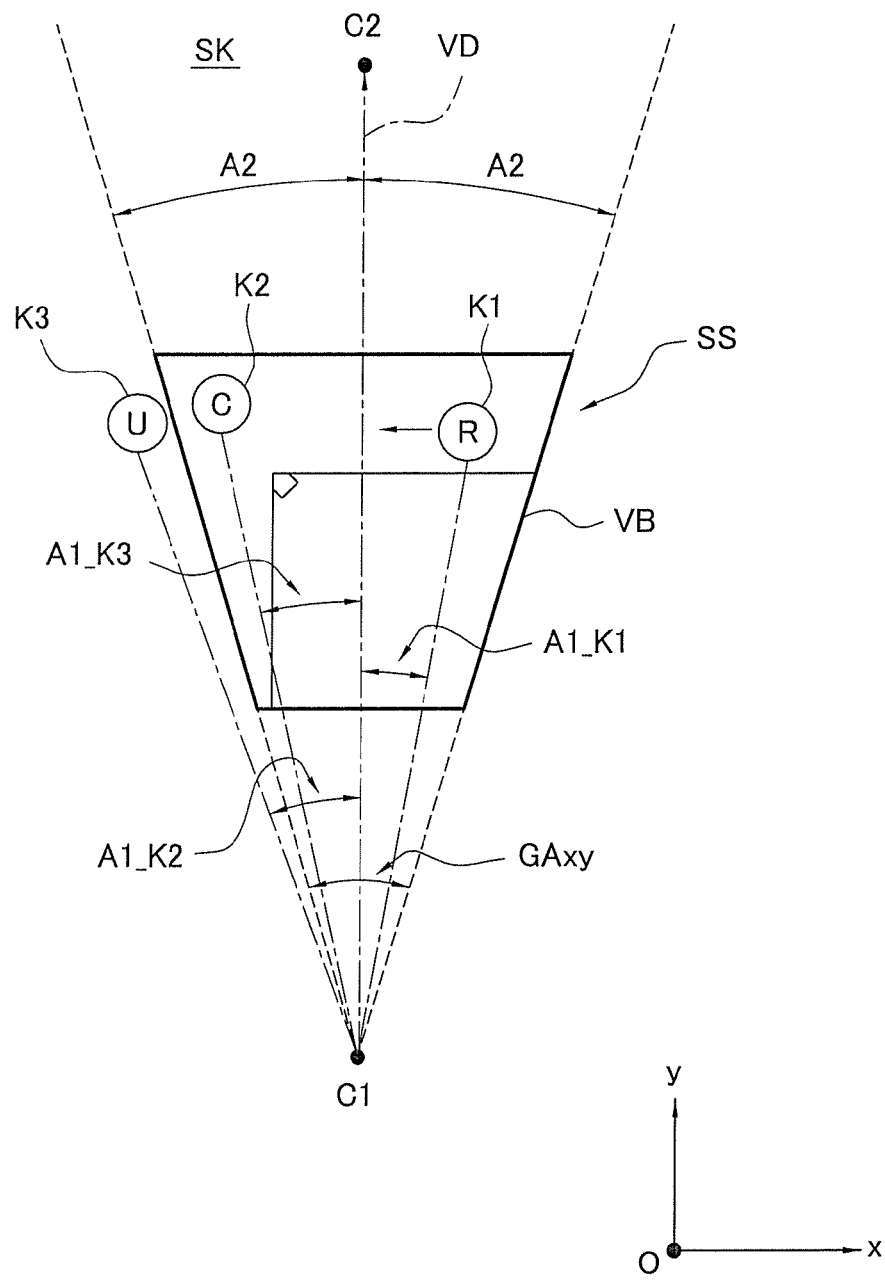
FIG. 5 is a diagram (part 2) showing the relationship between characters and the imaging space.
Figure 8A:
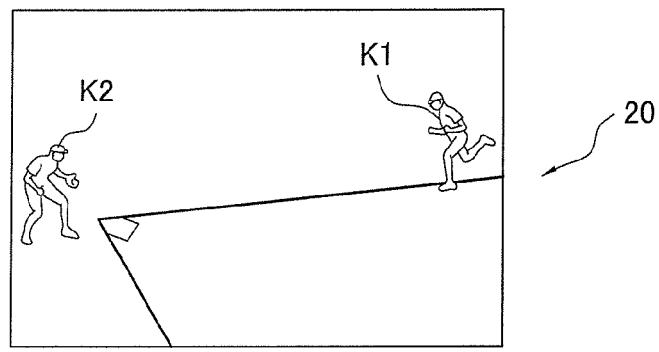
FIG. 8 is a view of the characters positioned in the imaging space displayed on a monitor.
Figure 8B:
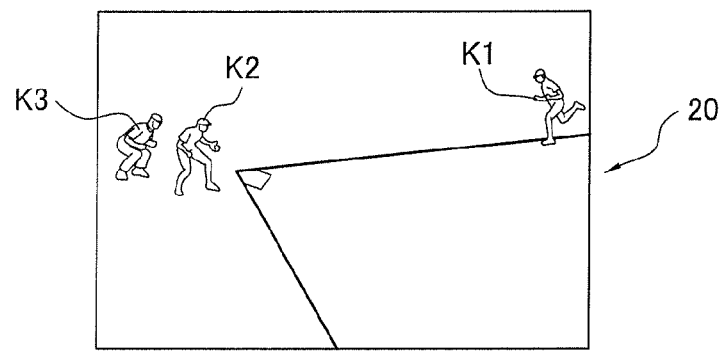

The image shown in FIG. 8A is produced when the imaging space SS is displayed on the television monitor 20 in the state that corresponds to FIG. 5. The image shown in FIG. 8A is shown as a reference and the image displayed on the television monitor 20 in the present embodiment is shown in FIG. 8B.

At this point, the CPU 7 executes (S412) at least one process from among a process for enlarging the viewing angle of the virtual camera and a process for moving the position of the virtual camera in a direction away from the plurality of characters so that a character positioned outside the imaging space SS is positioned inside the imaging space SS.

For example, the CPU 7 executes at least one process from among a process for enlarging the viewing angle of the virtual camera and a process for moving the position of the virtual camera in a direction away from the plurality of characters so that, when the umpire character K3 is positioned outside the imaging space SS in a close play at the home base, i.e., when the first angle A1_K3 of the umpire character K3 is equal to or greater than the second angle A2, the umpire character K3 is positioned inside the imaging space SS.

In this situation, the CPU 7 executes at least one process from among a process for enlarging the viewing angle of the virtual camera and a process for moving the position of the virtual camera in a direction away from the plurality of characters.

Figure 6:
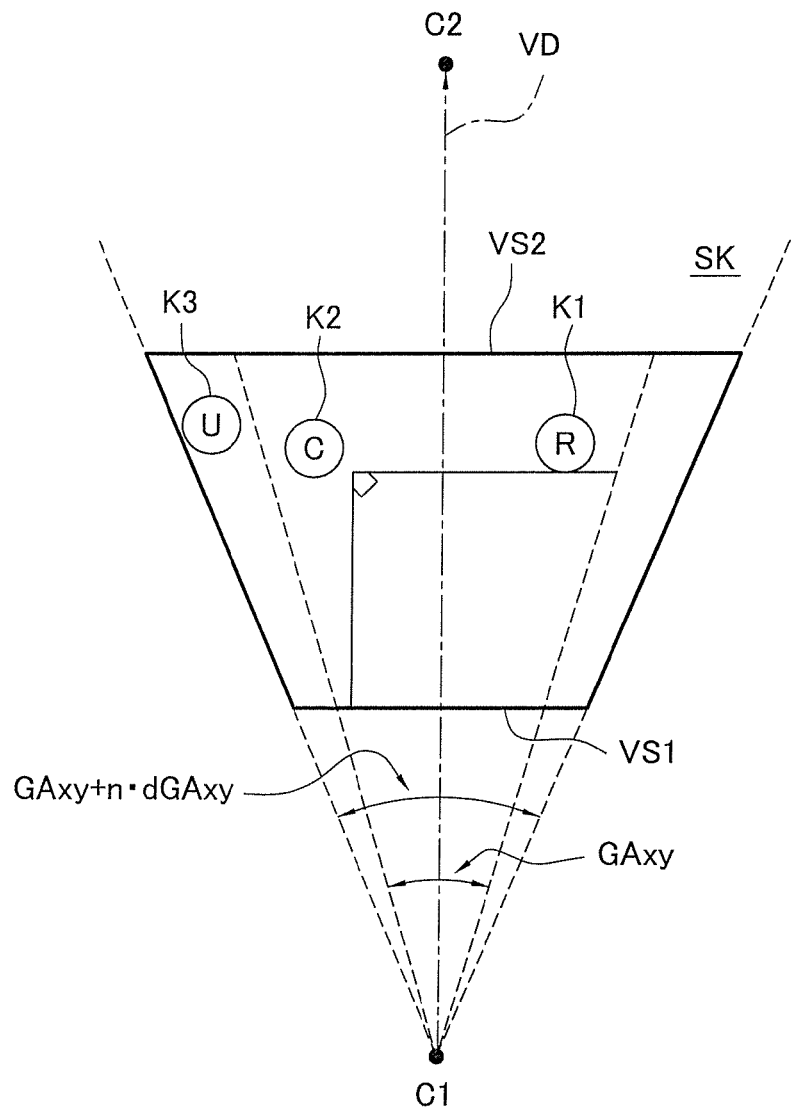
FIG. 6 is a diagram (part 1) showing the relationship between characters and the imaging space after the setting of the virtual camera has been modified.

For example, in the case of the process for enlarging the viewing angle of the virtual camera, the CPU 7 executes a process for adding a predetermined value dGAxy to the viewing angle data GA of the virtual camera (first viewing angle data GAxy), as shown in FIG. 6. The viewing angle of the virtual camera is thereby modified to be "GAxy+dGAxy." The CPU 7 executes the process until all of the characters are positioned within the imaging space SS. For example, the result of adding the value "n1·dGAxy" to the viewing angle GA of the virtual camera (first viewing angle data GAxy), i.e., "GAxy+n1·dGAxy" is the new viewing angle data of the virtual camera when the number of repetitions is n1. As used herein, n1 is a natural number.

Figure 7:
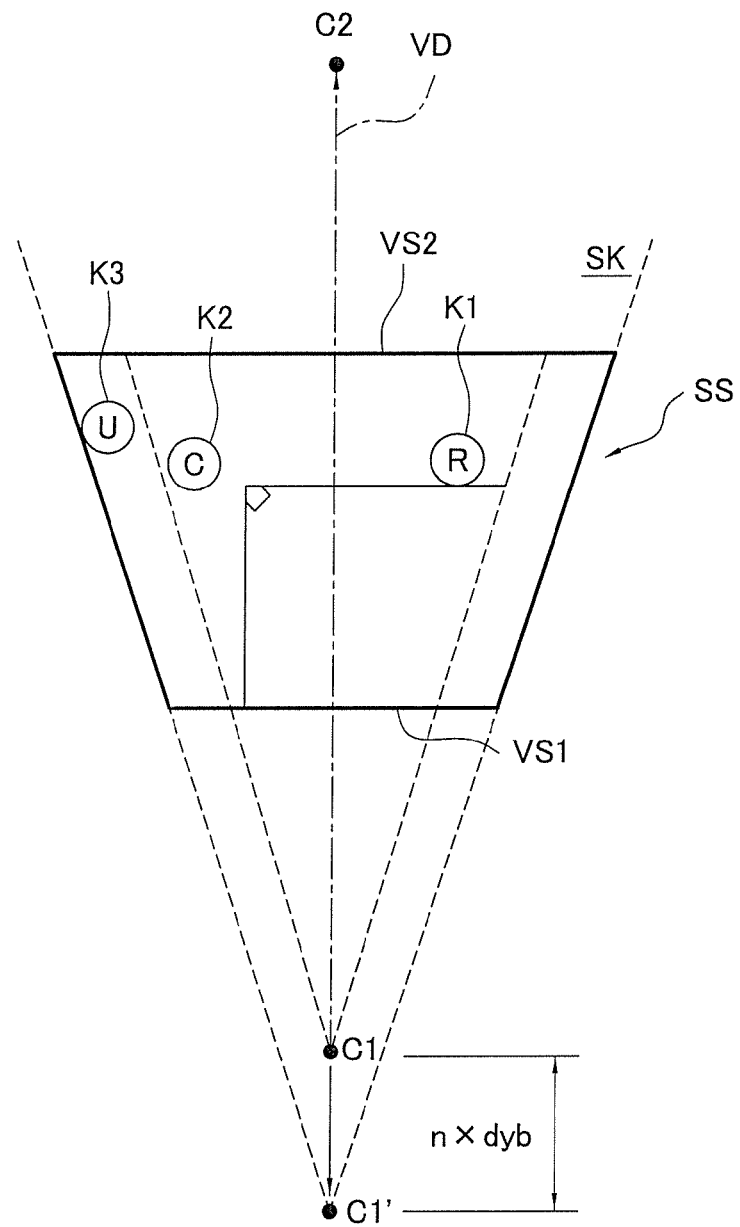
FIG. 7 is a diagram (part 2) showing the relationship between characters and the imaging space after the setting of the virtual camera has been modified.

In the case of the process for moving the position of the virtual camera in the direction away from the plurality of characters, the CPU 7 executes a process for adding a predetermined value dyb to the position coordinate data (x1, "y1", z1) of the virtual camera in the direction away from the plurality of characters, as shown in FIG. 7. The position coordinate data of the virtual camera is thereby modified to be "(x1, y1+dyb, z1)." The CPU 7 repeatedly executes the process until all of the characters are positioned within the imaging space SS. For example, the result of adding "n2·dyb" to the position coordinate data of the virtual camera (x1, "y1", z1) in the direction away from the plurality of characters, i.e., "(x1, y1+n2·dyb, z1)" is the new position coordinate data of the virtual camera when the number of repetitions is n2. As used herein, n2 is a natural number.

The defined position of the first plane and the defined position of the second plane in the imaging space SS is fixed when the process for enlarging the viewing angle of the virtual camera is executed or when the process for moving the position of the virtual camera in a direction away from the plurality of characters is executed. For this reason, the imaging space SS is enlarged when the viewing angle of the virtual camera is enlarged or when the virtual camera is moved in a direction away from the plurality of characters. In other words, in this case, the region in the horizontal direction (width direction) of the imaging space SS is enlarged.

Here, an example of the case in which the process for enlarging the viewing angle of the virtual camera (first process) or the process for moving the position of the virtual camera in a direction away from the plurality of characters (second process) will be described, but the execution of either process is stipulated in advance in the game program for each scene. In other words, the CPU 7 executes the process that corresponds to each scene. For example, in a certain scene, only the process for enlarging the viewing angle of the virtual camera (first process) is executed. In another scene, only the process for moving the position of the virtual camera in a direction away from the plurality of characters (second process) is executed. In yet another scene, the first process and the second process are both executed in a successive manner. In this manner, the correspondence relationship between each scene and the process to be executed in each scene is stipulated in advance in the game program.

The CPU 7 subsequently executes a process for calculating the coordinate data that corresponds to the center point of two characters on the basis of the coordinate data of each of the two characters most greatly separated in the 3-D virtual game space when all of the characters are positioned inside the imaging space SS, e.g., when the runner character K1, the catcher character K2, and the umpire character K3 are positioned inside the imaging space SS.

For example, the CPU 7 recognizes the two characters having the maximum value among each of the values of the absolute value of the difference between the x coordinate of the runner character K1 and the x coordinate of the catcher character K2, the absolute value of the difference between the x coordinate of the runner character K1 and the x coordinate of the umpire character K3, and the absolute value of the difference between the x coordinate of the catcher character K2 and the x coordinate of the umpire character K3. The CPU 7 executes a process for calculating the coordinate data that corresponds to the center point of the two characters on the basis of the coordinate data of each of the two characters.

The line-of-sight direction VD of the virtual camera is modified (S413) by causing the CPU 7 to again recognize the X coordinate of the center point thus calculated as the X coordinate of the second camera-coordinate data. In other words, the line-of-sight direction VD of the virtual camera is modified by causing the CPU 7 to execute a process for modifying the X coordinate of the second camera-coordinate data to be the X coordinate of the center point described above.

Next, the CPU 7 determines (S414) whether to show a close-up of the plurality of characters arranged in the imaging space SS. For example, in this case, the CPU 7 determines the horizontal distance between two characters on the basis of the coordinate data of each of the two characters disposed at the maximum horizontal distance from each other in the 3-D virtual game space. The CPU 7 determines whether or not the horizontal distance between the two characters is equal to or less than a distance for determining the timing of a close-up of the characters.

The CPU 7 issues a close-up command when the horizontal distance between two characters is equal to or less than a distance for determining the timing of a close-up of the characters (Yes in S141). At this point, the CPU 7 executes (S415) at least one process for reducing the viewing angle of the virtual camera and a process for moving the virtual camera in a direction approaching from the plurality of characters. Specifically, in a process for reducing the viewing angle of the virtual camera, the CPU 7 executes a process for subtracting a predetermined value from the viewing angle of the virtual camera. In the process for moving the position of the virtual camera in a direction approaching the plurality of characters, the CPU 7 executes a process for subtracting a predetermined value from the position coordinate data in a direction that approaches the plurality of characters.

The amount of angle reduction of the virtual camera and movement distance of the virtual camera used in this case is stipulated in advance in the game program. The process in this case has different reference numerals from the process of step 412 (S412), but the process can be executed in the same manner as the process of step 412 (S412).

Figure 9:
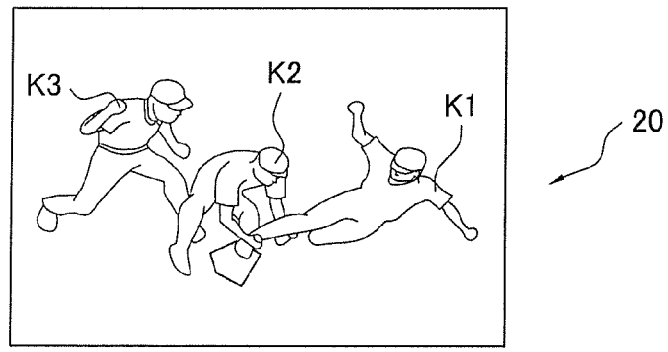
FIG. 9 is a close-up view of the characters during a close play.

When such processing is executed, each character, e.g., the runner character K1, the catcher character K2, and the umpire character K3 is displayed on the television monitor 20 using the image data of each character. When the ball is positioned inside the imaging space SS, the ball is displayed (S416) on the television monitor 20 using ball image data. In this manner, the characters (the runner character K1, the catcher character K2, and the umpire character K3) involved in the close play are displayed on the television monitor 20, as shown in FIG. 9, when the runner character K1 and the catcher character K2 (umpire character K3) have approached to a fixed distance. FIG. 9 is an enlarged display image as an example of a close play.

On the other hand, a close-up of the characters arranged in the imaging space SS is not taken when (No in S414) the horizontal distance between the two characters is greater than a distance for determining the timing of a close-up of the characters. In other words, the CPU 7 does not issue a close-up command. In this case, the characters arranged in the imaging space SS in a state in which the process of step 411 (S411) has ended are displayed (S416) on the television monitor 20 using the image data of each of the characters, as shown in FIG. 8B. The characters arranged in the imaging space SS in a state in which the process of step 413 (S413) has ended are displayed (S416) on the television monitor 20 using the image data of each of the characters.

Next, the CPU 7 determines (S417) whether or not the ball has arrived at the position of the characters. For example, the CPU 7 determines whether or not the catcher character has caught the ball. Specifically, the CPU 7 assigns a numerical value "1" to a flag in order to indicate that the ball has been caught by the catcher character when the ball has been caught by the catcher character. The CPU 7 assigns a numerical value "0" to a flag in order to indicate that the ball has not been caught by the catcher character when the ball has not been caught by the catcher character. The CPU 7 determines whether or not the ball has been caught by the catcher character by causing the CPU 7 to recognize the value of such flag.

For example, the process for displaying the play to be reproduced on the television monitor 20 is ended (S418) when the ball has been caught by the catcher character (Yes in S417). On the other hand, step 408 (S408) is executed again in the next frame when the ball has not be caught by the catcher character (No in S417).

The CPU 7 subsequently determines (S419) whether or not the competition has ended. In other words, the CPU 7 determines whether or not a command has been issued to end the competition. The process for storing various data in the RAM 12 is carried out (S420) when a command has been issued to end the competition (Yes in S419). Conversely, the CPU 7 repeatedly executes the process of step 404 (S404) and subsequent processes as long as a command has not been issued to end the competition (No in S419).

As described above, in the present embodiment, characters K1, K2, K3 positioned outside the imaging space can be automatically positioned inside the imaging space SS when it has been determined that at least one character among the plurality of characters K1, K2, K3 to be imaged is positioned outside the imaging space SS. In the particular case of the present embodiment, not only can the plurality of characters K1, K2, K3 positioned outside be merely positioned inside the imaging space SS, but the plurality of characters can also be arranged with good balance inside the imaging space SS. In this manner, in the present embodiment, the characters to be imaged can be readily accommodated on the monitor without the virtual camera being manually set. Also, in the present embodiment, the characters to be imaged can be accommodated on the monitor with good balance.

Other Embodiments (a) In the embodiment described above, an example was described for the case in which at least one option in the viewing angle of the virtual camera and the position of the virtual camera is modified so that, when the controller determines that a character to be imaged is positioned outside the imaging space, the character is positioned inside the imaging space.

In the embodiment described above, the characters to be imaged (the fielder character, the runner character, the umpire character) are displayed on the television monitor 20 so that mutual overlapping does not occur, even when other characters (the fielder character, the runner character, the umpire character) are positioned between the virtual camera and a certain character (the fielder character, the runner character, the umpire character) by applying means such as the following.

Figure 14:
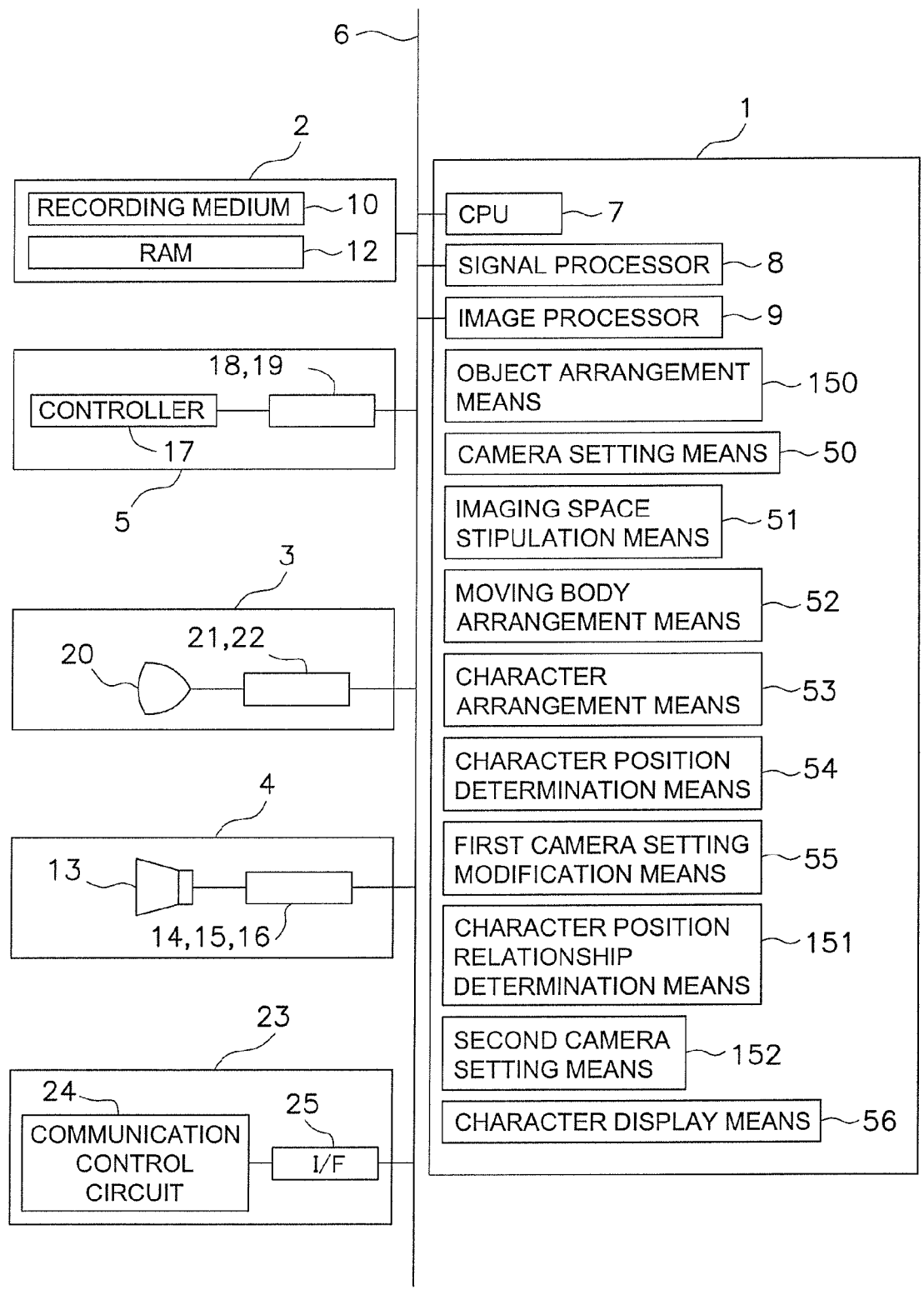
FIG. 14 is a block diagram of an example of the video game apparatus according to another embodiment.

Here, object arrangement means (unit) 150, character position relationship determination means (unit) 151, and second camera setting means (unit) 152, for example, are further added to the embodiment described above, as shown in FIG. 14. A description of the various means of the embodiment described above is omitted.

The object arrangement means 150 is used for arranging a static object inside a virtual game space by causing the CPU 7 to recognize the coordinate data of the static object in the virtual game space.

The character position relationship determination means 151 is used for causing the controller to determine whether or not another character excluding any one character among the plurality of characters is positioned between the virtual camera and any of the characters from among the plurality of characters on the basis of the first camera-coordinate data and the coordinate data of each of the plurality of characters.

The second camera setting modification means 152 is used for moving the position of the virtual camera by a predetermined angle using the position of the static object as a reference when the controller has determined that another character is positioned between the virtual camera and any of the characters.

In this case, in the camera setting means 50, the virtual camera is set in the virtual game space (see FIG. 15) by causing the controller to recognize first camera-coordinate data, second camera-coordinate data in which the position of the static object is used as a reference, and viewing angle data GA (GAxy) for stipulating the viewing angle of the virtual camera. The character position relationship determination means 151 and the second camera setting modification means 152 are used to move the position C1 of the virtual camera by a predetermined angle B (see FIG. 16) using the position C2 of the static object as a reference, when the controller has determined that another character K3 to be imaged is positioned between the virtual camera and the character K2 to be imaged.

Figure 15:
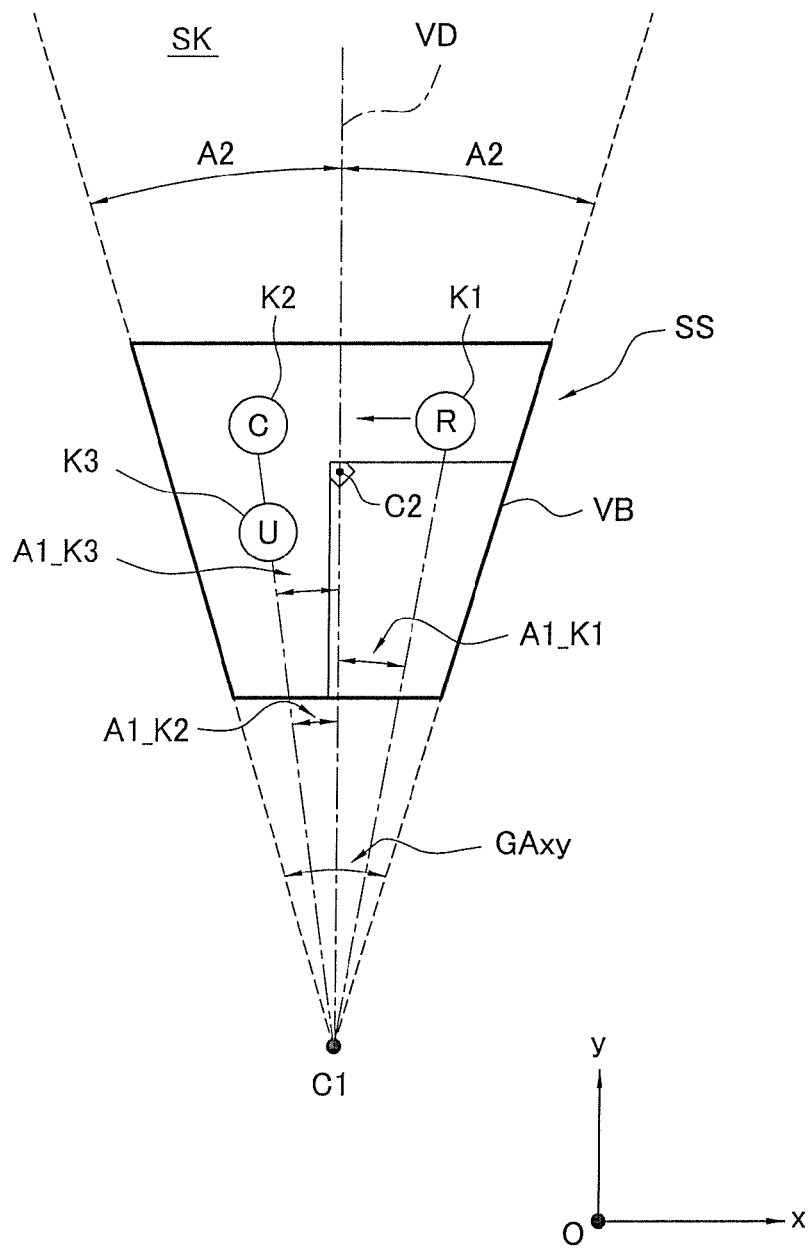
FIG. 15 is a diagram (part 1) showing the relationship between the characters and the imaging space according to another embodiment.

Specifically, the virtual camera is set in the virtual game space on the basis of the first camera-coordinate data C1, the second camera-coordinate data C2 in which the position of home base (the static object) is used as a reference, and the viewing angle data GA (GAxy) of the virtual camera, as shown in FIG. 15. In this case, the position indicated by the second camera-coordinate data is set to a predetermined position above home base.

Figure 16:
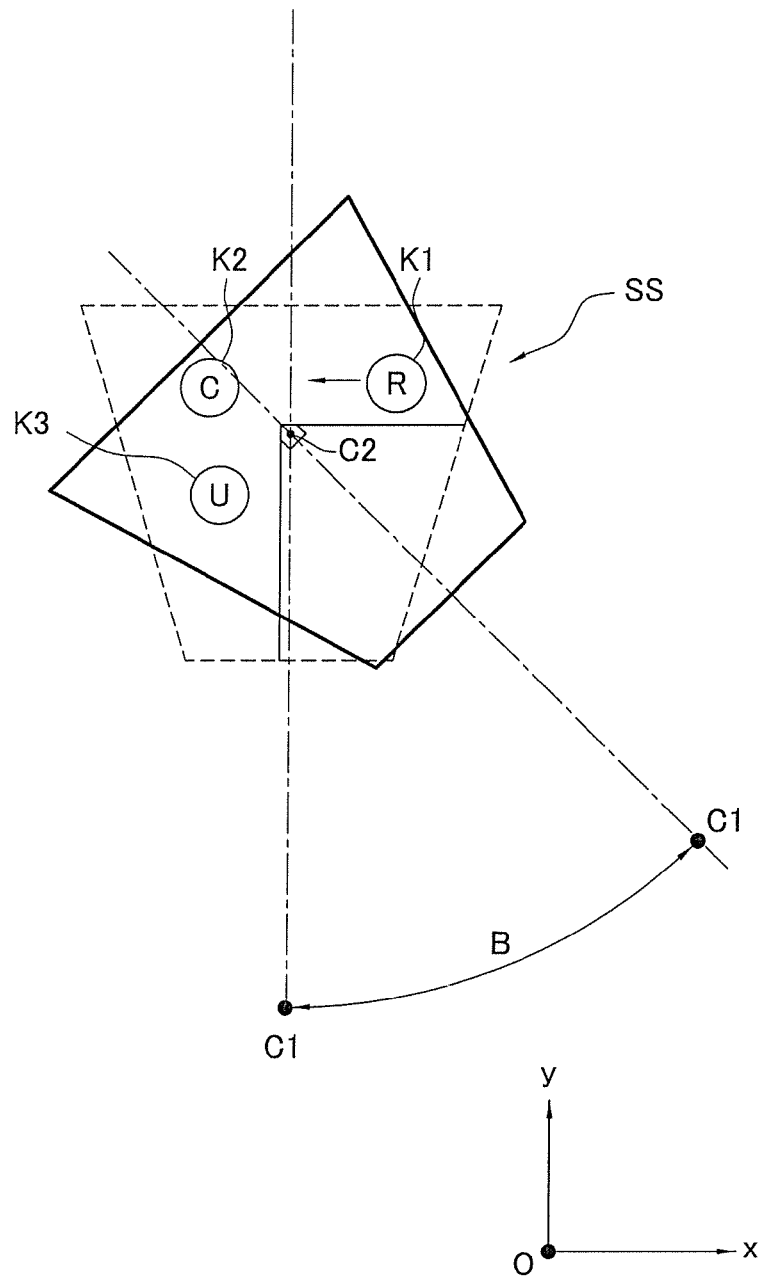
FIG. 16 is a diagram (part 2) showing the relationship between the characters and the imaging space according to another embodiment.

For example, the CPU 7 issues a command for moving the virtual camera by a predetermined angle B using the position C2 of home base as a reference, when umpire character K3 is positioned between the catcher character K2 and the virtual camera, as shown in FIG. 15. At this point, the virtual camera moves in the game space, as shown in FIG. 16. The umpire character K3 and the catcher character K2 are thereby displayed on the television monitor 20 without overlapping. In FIG. 16, an example is shown of the case in which the virtual camera moves 45 degrees in the counterclockwise direction, but the angle B can be arbitrarily set.

The CPU 7 executes the process related to the object arrangement means 150 between step 401 (S401) and step 402 (S402) of the embodiment described above. The CPU 7 executes the character position relationship determination means 151 and the second camera setting modification means 152 between step 415 (S415) and step 416 (S416) of the embodiment described above.

(b) In the embodiment described above, an example was described in which a close play occurs at the home base after the runner character has touched base, but the present invention is not limited to a close play at a base, and application can also be made to the following cases. For example, the present invention can be applied to the case in which a powerful hit flies in the left direction (left field) and the leftfielder character dives and tries to catch the fly ball. This scene may be an important scene that is a fine play in which the ball is caught, or hit in which the ball is not caught. In this circumstance, an important factor is whether or not the centerfielder character is in a position that allows him cover for such a situation in which the hit ball has passed by the leftfielder character. Accordingly, the virtual camera is automatically adjusted so that the centerfielder character is accommodated within the angle of visibility when the centerfielder character is outside of the angle of visibility of the virtual camera.

(c) In the embodiment described above, an example was shown for the case in which a home video game apparatus was used as an example of a computer to which the game program can be applied, but the game apparatus is not limited to the embodiment described above and similar application can be made to a game apparatus composed of a separate monitor, a game apparatus integrated with a monitor, a personal computer or a work station that functions as a game apparatus by executing a game program, as well as other configurations.

(d) Also included in the present embodiment are a program for executing the game such as that described above and a computer-readable recording medium on which the program is recorded. In addition to a cartridge, examples of the recording medium include a computer-readable flexible disk, semiconductor memory, CD-ROM, DVD, MO, and ROM cassette.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A non-transitory computer readable medium storing a computer program for a video game in which characters are arranged in a virtual game space, and are displayed on an image display unit, the computer program comprising:
    code for recognizing a position of a virtual camera in the virtual game space, a line-of-sight direction of the virtual camera when the virtual game space is imaged from the position of the virtual camera, and a viewing angle of the virtual camera, the characters being displayable, when the characters are within the viewing angle;
    code for stipulating an imaging space in the virtual game space by recognizing a boundary;
    code for arranging a plurality of the characters in the virtual game space;
    code for determining whether or not the plurality off characters are positioned inside the imaging space;
    code for positioning all of the plurality of characters in the imaging space by at least one of widening the viewing angle and modifying the position of the virtual camera, when at least one of the plurality of characters is determined to be positioned outside the imaging space;
    code for, after having positioned all of the plurality of characters in the image space, determining the longest horizontal distance between any two characters among the plurality of characters;
    code for recognizing first and second characters of which a distance is the longest horizontal distance;
    code for recognizing a center point of the first and second characters;
    code for turning the line-of-sight direction of the virtual camera toward the center point; and
    code for displaying all of the plurality of characters on the image display unit.

2. The non-transitory computer readable medium as recited in claim 1, wherein
    the modifying the viewing angle includes enlarging the viewing angle of the virtual camera.

3. The non-transitory computer readable medium as recited in claim 1, wherein
    the modifying the position of the virtual camera includes moving the position of the virtual camera in a direction away from the plurality of characters.

4. The non-transitory computer readable medium as recited in claim 1, further comprising
    code for positioning all of the plurality of characters in the imaging space by modifying the line-of-sight direction of the virtual camera is executed by the controller.

5. The non-transitory computer readable medium as recited in claim 1, wherein
the code for determining whether or not the plurality of characters are positioned inside the imaging space includes code for confirming whether or not a first angle is less than a second angle,
the first angle is formed by a straight line connecting the virtual camera with each of the plurality of characters and the line-of-sight direction, and
the second angle is formed by the line-of-sight direction and the boundary of the imaging space.

6. The non-transitory computer readable medium as recited in claim 1, further comprising
code arranging a moving body that moves in the virtual game space, wherein
the plurality of characters include a first character, a second character, and a third character,
the first character being arranged to collide with the moving body,
the second character is positioned away from the first character, and
the third character positioned away from the first character and the second character.

7. The non-transitory computer readable medium as recited in claim 1, further comprising
code for arranging a static object inside the virtual game space, wherein
the line-of-sight direction of the virtual camera is defined from the position of the virtual camera to a position of the static object.

8. The non-transitory computer readable medium as recited in claim 7, further comprising
code for determining whether or not a first character anyone of the plurality of characters is positioned between the virtual camera and a second character of the plurality of the characters other than the first character excluding the any one of the plurality of characters, wherein
the modifying the position of the virtual camera is by moving the position of the virtual camera at a predetermined angle by using the position of the static object as a reference, when the any one of the plurality of characters is positioned between the virtual camera and the character excluding the any one of the plurality of characters.

9. The non-transitory computer readable medium as recited in claim 1, further comprising
code for determining whether or not a play is eligible for reproduction on the image display unit, wherein
the plurality of characters are arranged in the virtual game space, if the play is eligible for the reproduction.

10. A game control method for controlling a video game by a central processing unit (CPU), in which characters are arranged in a virtual game space, and are displayed on an image display unit, the game control method comprising:
recognizing by the CPU a position of a virtual camera in the virtual game space, a line-of-sight direction of the virtual camera when the virtual game space is imaged from the position of the virtual camera, and a viewing angle of the virtual camera, the characters being displayable, when the characters are within the viewing angle;
stipulating by the CPU an imaging space in the virtual game space by recognizing a boundary;
arranging by the CPU a plurality of the characters in the virtual game space;
determining by the CPU whether or not the plurality of characters are positioned inside the imaging space;
positioning by the CPU all of the plurality of characters in the imaging space by at least one of widening the viewing angle and modifying the position of the virtual camera, when at least one of the plurality of characters is determined to be positioned outside the imaging space;
determining, after having positioned all of the plurality of characters in the image space, by the CPU the longest horizontal distance between any two characters among the plurality of characters;
recognizing by the CPU first and second characters of which a distance is the longest horizontal distance;
recognizing by the CPU a center point of the first and second characters;
turning by the CPU the line-of-sight direction of the virtual camera toward the center point; and
displaying by the CPU on the image display unit all of the plurality of characters on the image display unit.

* * * * *